(12) United States Patent
Klemm et al.

(10) Patent No.: US 12,450,856 B2
(45) Date of Patent: Oct. 21, 2025

(54) HYBRID NIGHT VISION

(71) Applicant: SimpliSafe, Inc., Boston, MA (US)

(72) Inventors: Kevin Klemm, Waltham, MA (US);
Brooke Edington, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 5 days.

(21) Appl. No.: 18/443,865

(22) Filed: Feb. 16, 2024

(65) Prior Publication Data

US 2025/0191323 A1    Jun. 12, 2025

Related U.S. Application Data

(60) Provisional application No. 63/603,014, filed on Nov. 27, 2023.

(51) Int. Cl.
| | | |
|---|---|---|
| G06V 20/52 | (2022.01) | |
| G06V 10/143 | (2022.01) | |
| G06V 40/10 | (2022.01) | |
| H04N 7/18 | (2006.01) | |
| H04N 23/11 | (2023.01) | |
| H04N 23/12 | (2023.01) | |
| H04N 23/71 | (2023.01) | |
| H04N 23/74 | (2023.01) | |

(52) U.S. Cl.
CPC ............ *G06V 10/143* (2022.01); *G06V 20/52* (2022.01); *G06V 40/10* (2022.01); *H04N 7/183* (2013.01); *H04N 23/11* (2023.01); *H04N 23/12* (2023.01); *H04N 23/71* (2023.01); *H04N 23/74* (2023.01)

(58) Field of Classification Search
CPC ...... G06V 10/143; G06V 20/52; G06V 40/10; H04N 7/183; H04N 23/11; H04N 23/12; H04N 23/71; H04N 23/74
USPC .......................................................... 382/274
See application file for complete search history.

(56) References Cited

U.S. PATENT DOCUMENTS

2014/0125813 A1*  5/2014  Holz ................. G06F 3/017
348/169

* cited by examiner

*Primary Examiner* — Stephen P Coleman
(74) *Attorney, Agent, or Firm* — Finch & Maloney PLLC

(57) ABSTRACT

A method comprises illuminating an area using an infrared light source. The method further comprises, while the area is illuminated using the infrared light source, capturing one or more images of the area. The method further comprises analyzing the one or more images to identify an object in the area. The method further comprises, after identifying the object, illuminating the area using a visible light source.

20 Claims, 13 Drawing Sheets

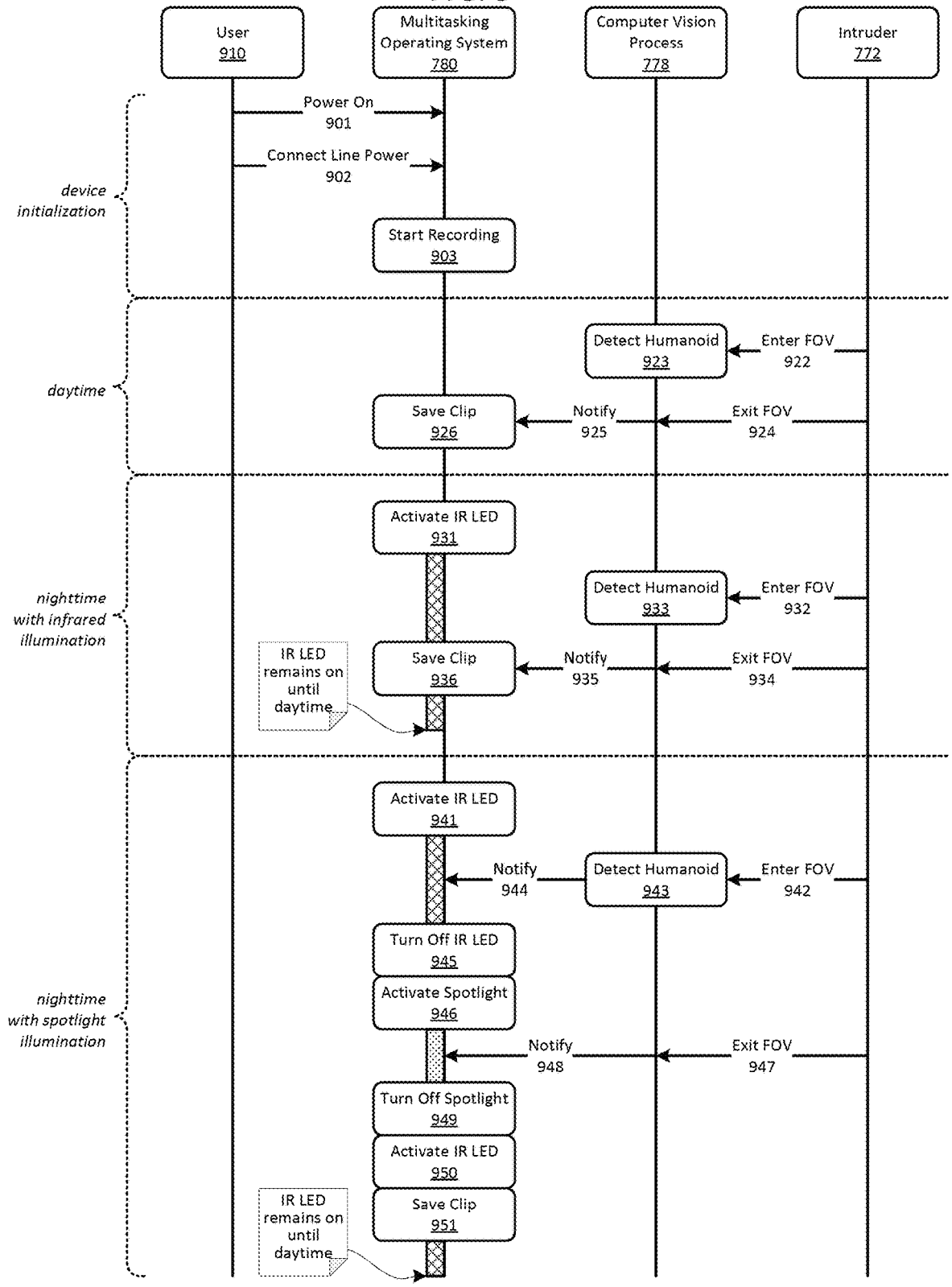

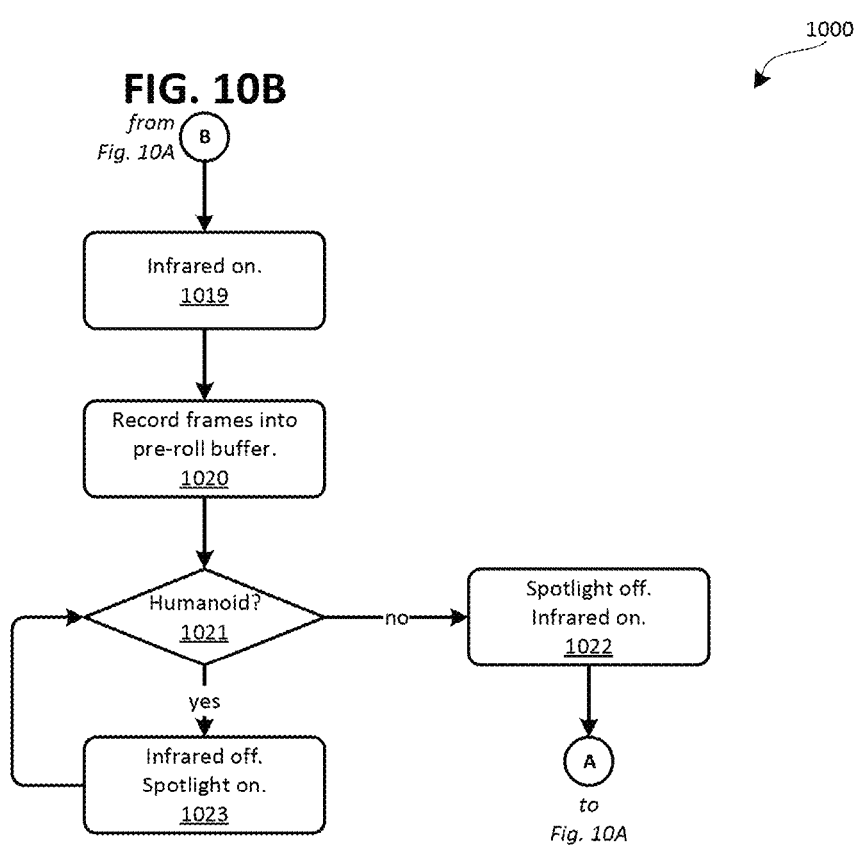

HYBRID NIGHT VISION

CROSS-REFERENCE TO RELATED APPLICATION

This application claims the benefit of U.S. Provisional Patent Application 63/603,014 (filed 27 Nov. 2023), which is hereby incorporated herein by reference in its entirety.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for detecting and monitoring a potential security threat in low light conditions.

One example is directed to a method. The method comprises illuminating an area using an infrared light source. The method further comprises, while the area is illuminated using the infrared light source, capturing one or more images of the area. The method further comprises analyzing the one or more images to identify an object in the area. The method further comprises, after identifying the object, illuminating the area using a visible light source.

Another example is directed to a camera. The camera comprises an image sensor. The camera further comprises an infrared light source. The camera further comprises a visible light source. The camera further comprises power supply circuitry configured to receive power from a line power source and provide power to the infrared light source and the visible light source. The camera further comprises at least one processor that is operatively coupled to the image sensor, the infrared light source, and the visible light source. The at least one processor is configured to illuminate an area using the infrared light source. The at least one processor is further configured to, while the area is illuminated using the infrared light source, use the image sensor to capture one or more images of the area. The at least one processor us further configured to analyze the one or more images to identify an object in the area. The at least one processor is further configured to, after identifying the object, illuminate the area using the visible light source.

Another example is directed to one or more non-transitory computer readable media storing sequences of instructions executable to control a security camera disposed at a location. The sequences of instructions comprise instructions to illuminate an area using a first light source. The sequences of instructions further comprise instructions to, while the area is illuminated using the first light source, capture one or more images of the area. The sequences of instructions further comprise instructions to analyze the one or more images to identify an object in the area. The sequences of instructions further comprise instructions to, after identifying the object, illuminate the area using a second light source.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 9 is a sequence diagram of a monitoring process that can be implemented using an image capture device configured according to some examples described herein.

FIGS. 10A and 10B are a flowchart illustrating a monitoring process that can be implemented using an image capture device configured according to some examples described herein.

DETAILED DESCRIPTION

Figure 1:
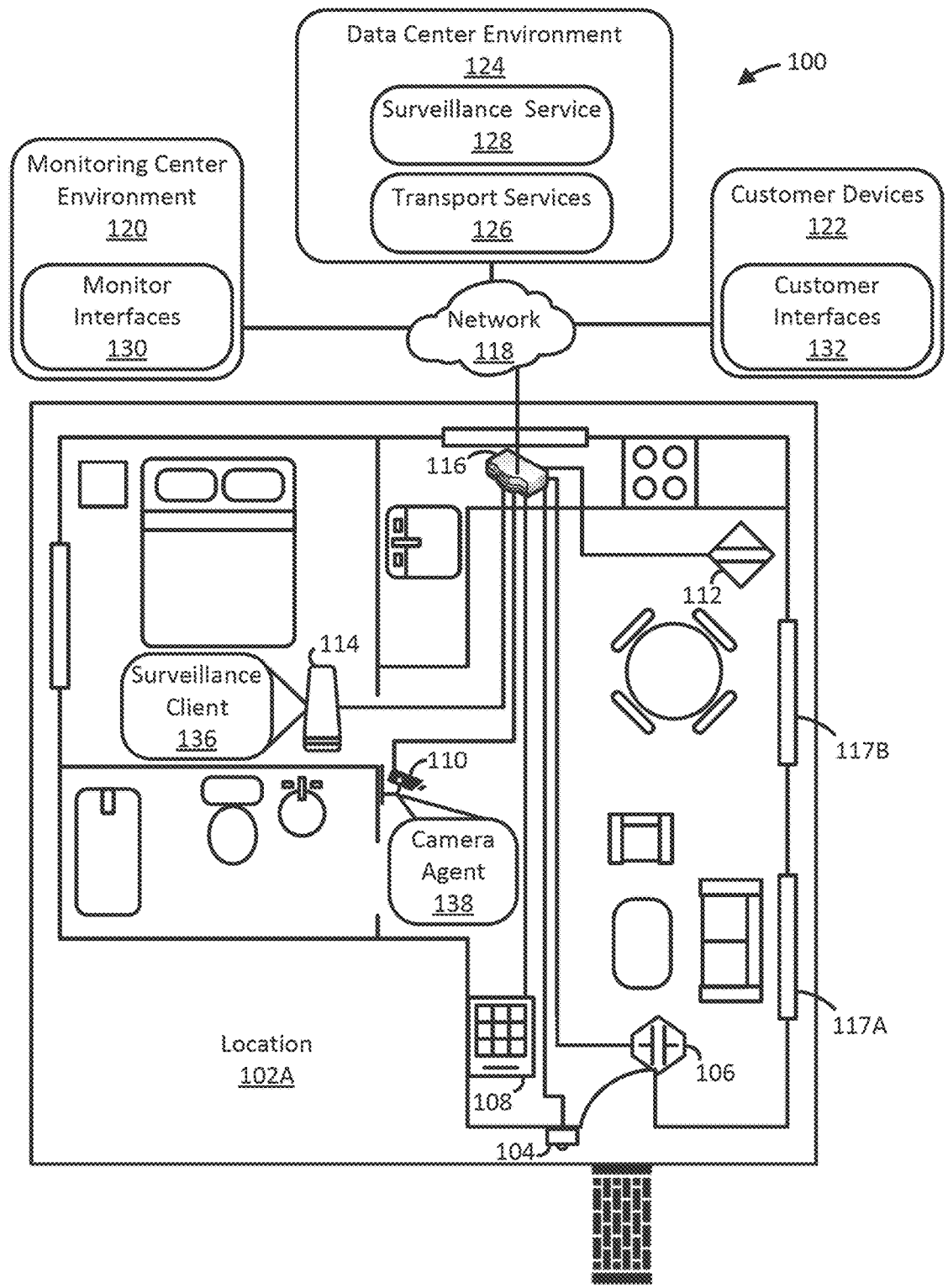
FIG. 1 is a schematic diagram of a security system, according to some examples described herein.

As summarized above, at least some examples disclosed herein are directed to systems and processes that implement techniques to acquire images while operating in low light conditions using a plurality of distinct operational modes. The distinct operational modes may correspond to using different light sources to illuminate a monitored location. For instance, in at least one example, a camera (for example, an outdoor camera or a security camera) detects a person and/or an object in a discreet manner using an infrared light source in a first operational mode. After detecting the person and/or the object, the camera switches to a visible light source, such as a visible spotlight, to capture higher quality recordings in a second operational mode. This use of multiple, discrete electromagnetic radiation frequencies to detect a person and record his/her activity allows the camera to actively balance subtlety, deterrence, and effectiveness.

In at least one example, a camera is configured to toggle between using an infrared light emitting diode and a visible spotlight light emitting diode as an illumination source based on output generated by a computer vision process. In this example, the camera uses the infrared light emitting diode to discretely acquire and analyze initial images before and through the time when a person is initially detected. If it is determined that the initial images acquired using the infrared light source depict a person, the camera switches on a spotlight that emits visible light to continue to verify that a person is present and to record higher quality images of the detected person using visible light. This approach to surveillance enables the security camera to limit its use of the spotlight, which can be invasive and disruptive, especially in a home security context, while still allowing the initial capture of frames using the infrared light source for initial recording and object detection using computer vision processing.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (for example, as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (for example, devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, and so forth. In at least one example, the location-based devices can communicate with one another using a sub-GHz wireless networking standard, such as IEEE 802.11ah, Z-WAVE, ZIGBEE, and so forth. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (for example, similar to the router 116) that is configured to communicate with the network 118 and computing devices collocated with or near the network equipment. It should be noted that, in some examples, the network 118 and the network extant within the location 102A support other communication protocols, such as MQTT or other IoI protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (for example, MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (for example, desktop computers) and network equipment (for example, one or more routers) connected to the computing devices and the network 118. The customer devices 122 can include personal computing devices (for example, a desktop computer, laptop, tablet, smartphone, or the like) and network equipment (for example, a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (for example, via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (for example, via sub-GHz networking) and/or indirectly to any device within the system 100 (for example, via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (for example, the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (for example, ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (for example, a tactile interface, such as a set of physical buttons or a set of virtual buttons on a touchscreen) configured to interact with a user (for example, receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, and so forth) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112;

sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (for example, via the keypad 108 or a customer interface 132), or data derived from one or more of these data types (for example, filtered sensor data, summarizations of sensor data, event data specifying an event detected at the location via the sensor data, and so forth).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (for example, the surveillance client 136) implemented by base stations (for example, the base station 114) and/or processes (for example, the camera agent 138) implemented by other devices (for example, the image capture device 110). Individual instances of a transport service within the transport services 126 can be associated with and specific to certain manufactures and models of location-based monitoring equipment (for example, SIMPLISAFE equipment, RING equipment, and so forth). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (for example, a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (for example, rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figure 2:
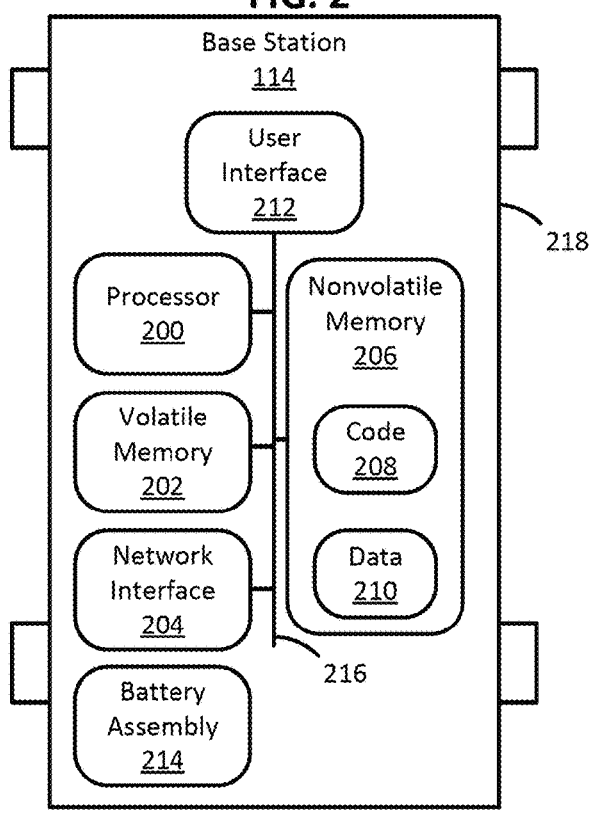
FIG. 2 is a schematic diagram of a base station, according to some examples described herein.

Turning now to FIG. 2, an example base station 114 is schematically illustrated. As shown in FIG. 2, the base station 114 includes at least one processor 200, volatile memory 202, nonvolatile memory 206, at least one network interface 204, a user interface 212, a battery assembly 214, and an interconnection mechanism 216. The nonvolatile memory 206 stores executable code 208 and includes a data store 210. In some examples illustrated by FIG. 2, the features of the base station 114 enumerated above are incorporated within, or are a part of, a housing 218.

In some examples, the nonvolatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the nonvolatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (for example, the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the nonvolatile memory 206 to the volatile memory 202. In some examples, the volatile memory 202 includes one or more static or dynamic random access memory (RAM) chips and/or cache memory (for example, memory disposed on a silicon die of the processor 200). Volatile memory 202 can offer a faster response time than a main memory, such as the nonvolatile memory 206.

Through execution of the code 208, the processor 200 can control operation of the network interface 204. For instance, in some examples, the network interface 204 includes one or more physical interfaces (for example, a radio, an ethernet port, a universal serial bus (USB) port, and so forth) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (for example, the location-based devices) via a computer network (for example, the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, a 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (for example, a keyboard, a mouse, a touchscreen, a display, a speaker, a camera, an accelerometer, a biometric scanner, an environmental sensor, and so forth) and a software stack including drivers and/or other code 208 that is configured to communicate with the user input and/or output devices. For instance, the user interface 212 can be implemented by a customer device 122 hosting a mobile application (for example, a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (for example, one or more NIMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Figure 3:
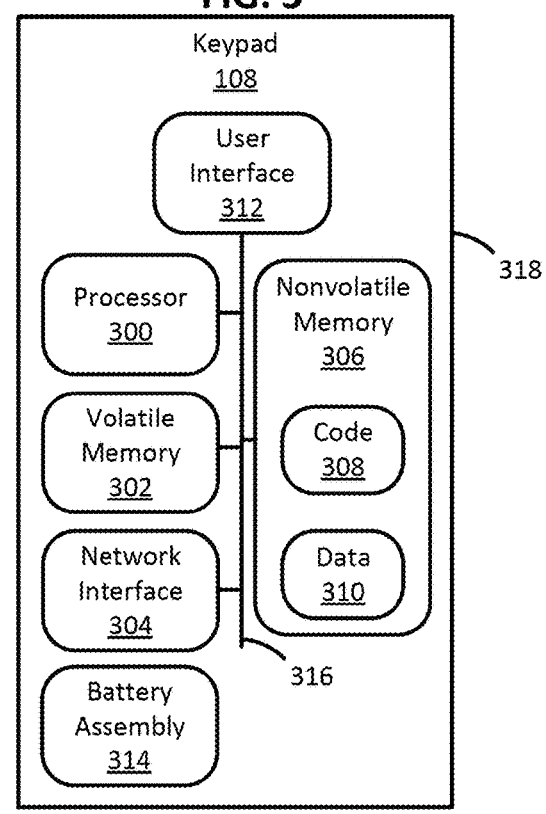
FIG. 3 is a schematic diagram of a keypad, according to some examples described herein.

Turning now to FIG. 3, an example keypad 108 is schematically illustrated. As shown in FIG. 3, the keypad 108 includes at least one processor 300, volatile memory 302, nonvolatile memory 306, at least one network interface 304, a user interface 312, a battery assembly 314, and an interconnection mechanism 316. The nonvolatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the nonvolatile memory 206, the interconnection mechanism 216, and the battery assembly 214 with reference to the base station 114 are applicable to the processor 300, the volatile memory 302, the nonvolatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (for example, a radio, an ethernet port, a USB port, and so forth) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (for example, the other location-based devices) via a computer network (for example, the LAN established by the router 116 and/or a point-to-point connection).

Continuing with the example of FIG. 3, through execution of the code 308, the processor 300 can control operation of the user interface 312. In some examples, the user interface 312 includes user input and/or output devices (for example, physical keys arranged as a keypad, a touchscreen, a display, a speaker, a camera, a biometric scanner, an environmental sensor, and so forth) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (for example, one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
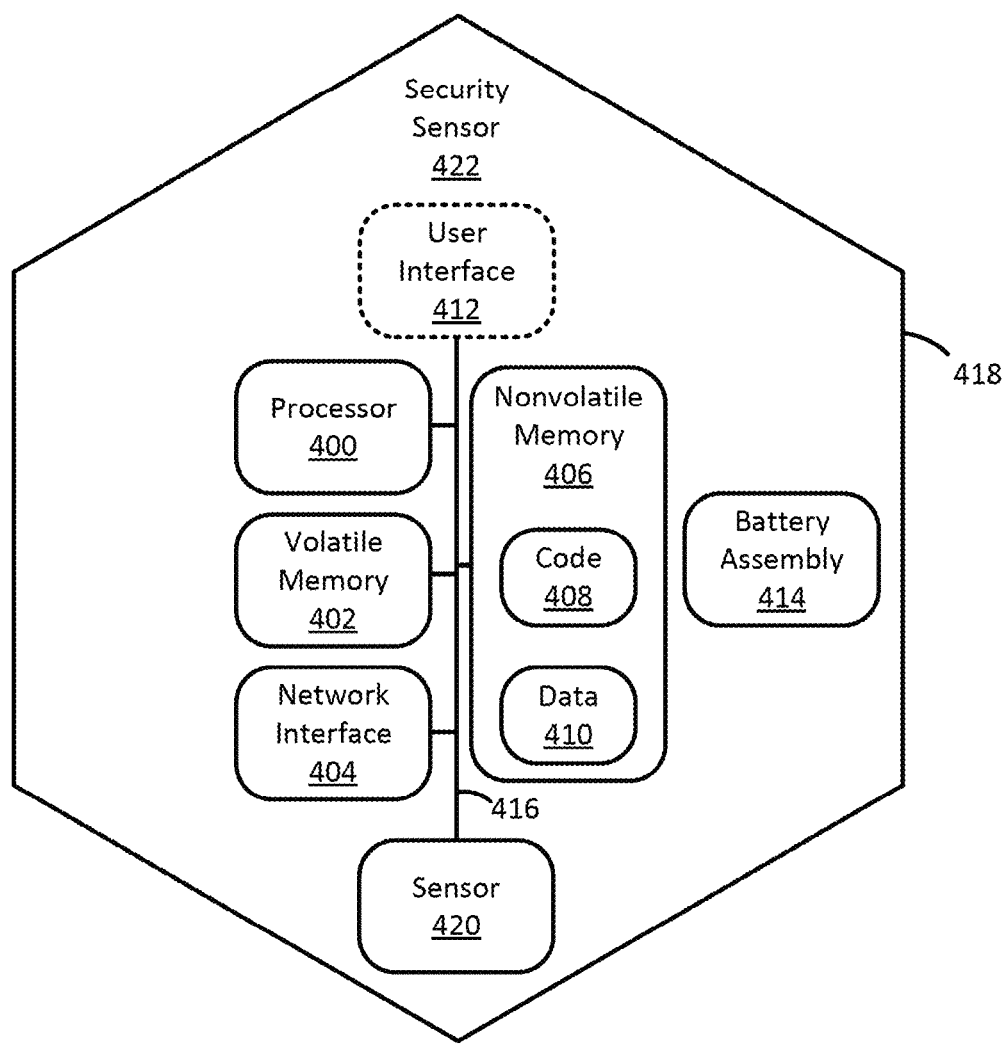
FIG. 4A is a schematic diagram of a security sensor, according to some examples described herein.

Turning now to FIG. 4A, an example security sensor 422 is schematically illustrated. Particular configurations of the security sensor 422 (for example, the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, nonvolatile memory 406, at least one network interface 404, a battery assembly 414, an interconnection mechanism 416, and at least one sensor assembly 420. The nonvolatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the nonvolatile memory 206, the interconnection mechanism 216, and the battery assembly 214 with reference to the base station 114 are applicable to the processor 400, the volatile memory 402, the nonvolatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (for example, a radio (including an antenna), an ethernet port, a USB port, and so forth) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (for example, the other location-based devices) via a computer network (for example, the LAN established by the router 116 and/or a point-to-point connection). For instance, in at least one example, when executing the code 408, the processor 400 controls the network interface to stream (for example, via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (for example, physical buttons, a touchscreen, a display, a speaker, a camera, an accelerometer, a biometric scanner, an environmental sensor, one or more LEDs, and so forth) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (for example, a charge-coupled device or an active-pixel sensor) and/or a temperature or thermographic sensor (for example, an active and/or passive infrared (PIR) sensor). Regardless of the type of sensor or sensors housed, the processor 400 can (for example, via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
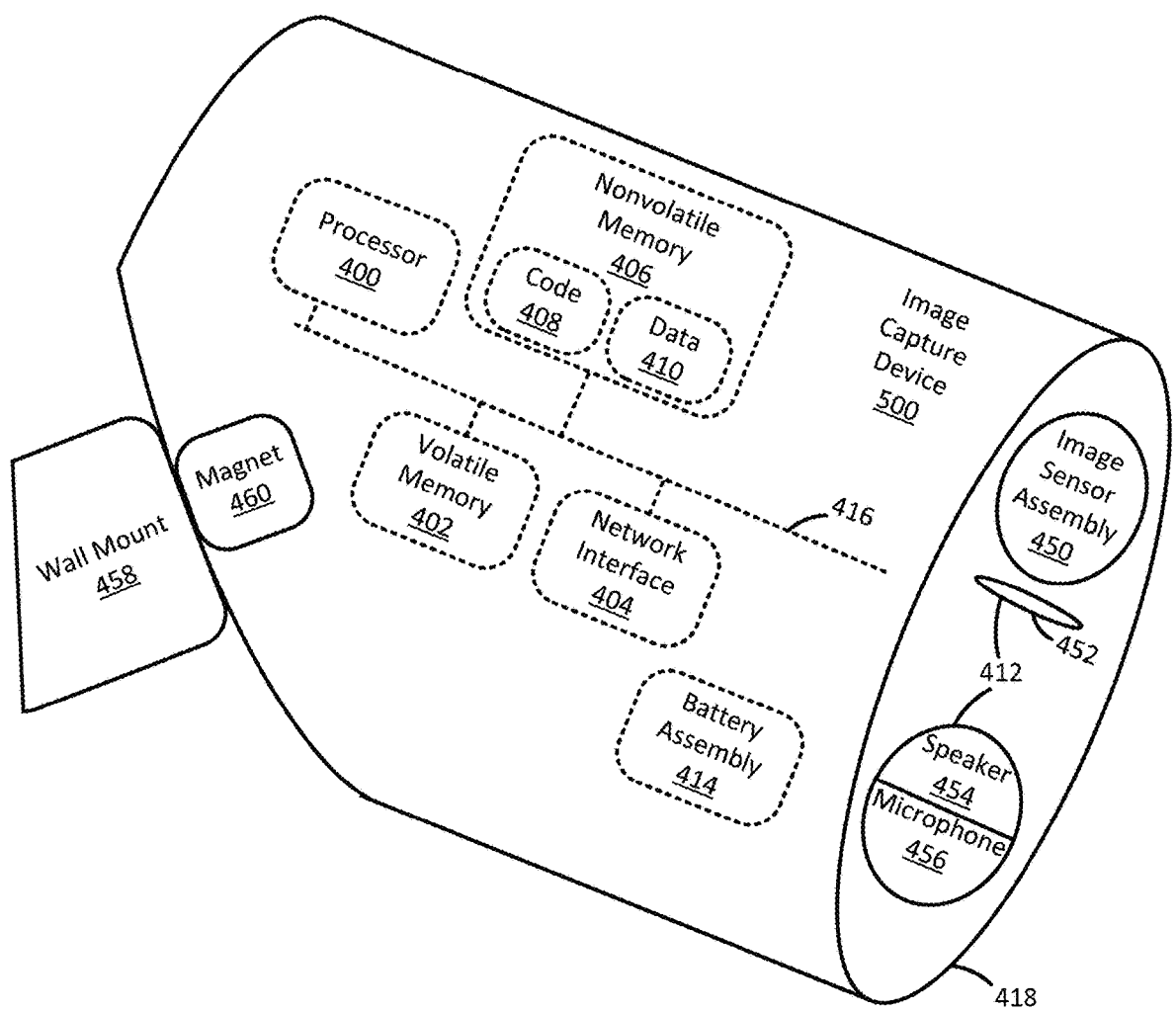
FIG. 4B is a schematic diagram of an image capture device, according to some examples described herein.

Turning now to FIG. 4B, an example image capture device 500 is schematically illustrated. Particular configurations of the image capture device 500 (for example, the image capture devices 104 and 110) are illustrated in FIG. 1 and described above. As shown in FIG. 4B, the image capture device 500 includes at least one processor 400, volatile memory 402, nonvolatile memory 406, at least one network interface 404, a battery assembly 414, and an interconnection mechanism 416. These features of the image capture device 500 are illustrated in dashed lines to indicate that they reside within a housing 418. The nonvolatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (for example, a charge-coupled device or an active-pixel sensor) and/or a temperature or thermographic sensor (for example, an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the nonvolatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (for example, a sonic alarm via the siren) or streamed from the base station 114 (or one of the processes 130, 128, or 132 of FIG. 1) via the network interface 404 (for example, utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
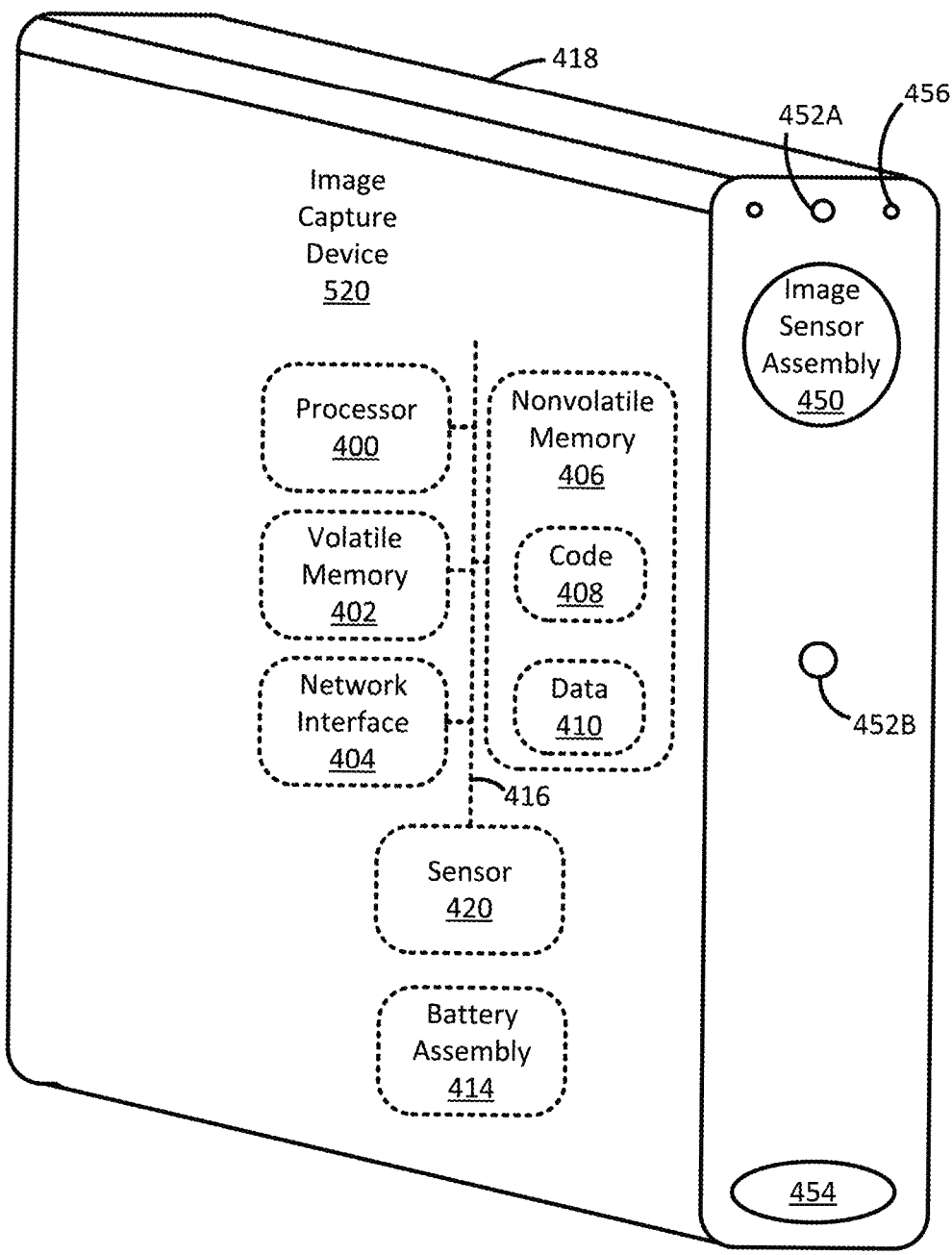
FIG. 4C is a schematic diagram of another image capture device, according to some examples described herein.

Turning now to FIG. 4C, another example image capture device 520 is schematically illustrated. Particular configurations of the image capture device 520 (for example, the image capture devices 104 and 110) are illustrated in FIG. 1 and described above. As shown in FIG. 4C, the image capture device 520 includes at least one processor 400, volatile memory 402, nonvolatile memory 406, at least one network interface 404, a battery assembly 414, and an interconnection mechanism 416. These features of the image capture device 520 are illustrated in dashed lines to indicate that they reside within a housing 418. The nonvolatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
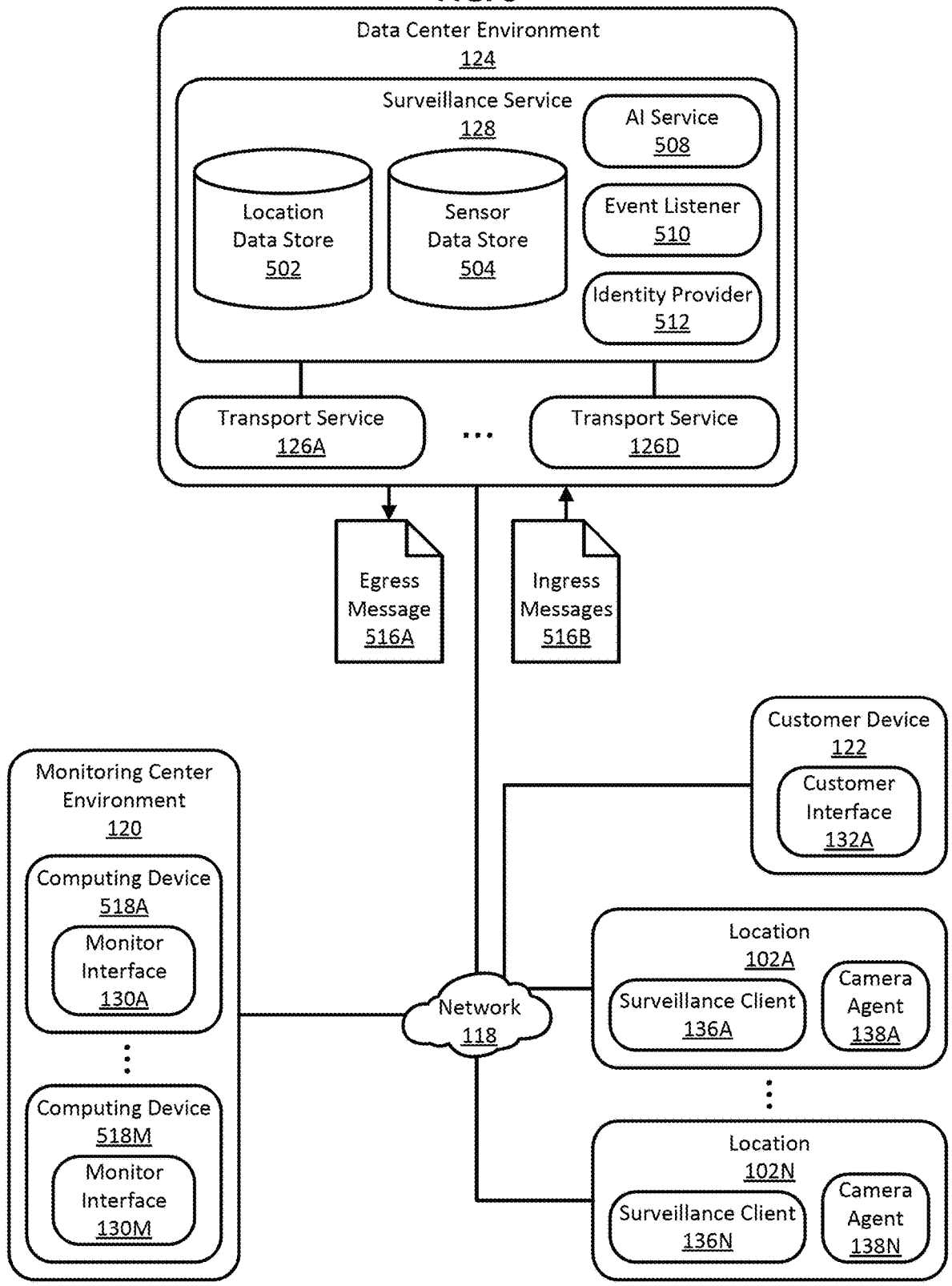
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (for example, the base station 114 of FIG. 1, not shown) that host the surveillance clients 136A through 136N (collectively referred to as the surveillance clients 136) and image capture devices (for example, the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (for example, one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (for example, images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (for example, a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (for example, via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (for example, unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
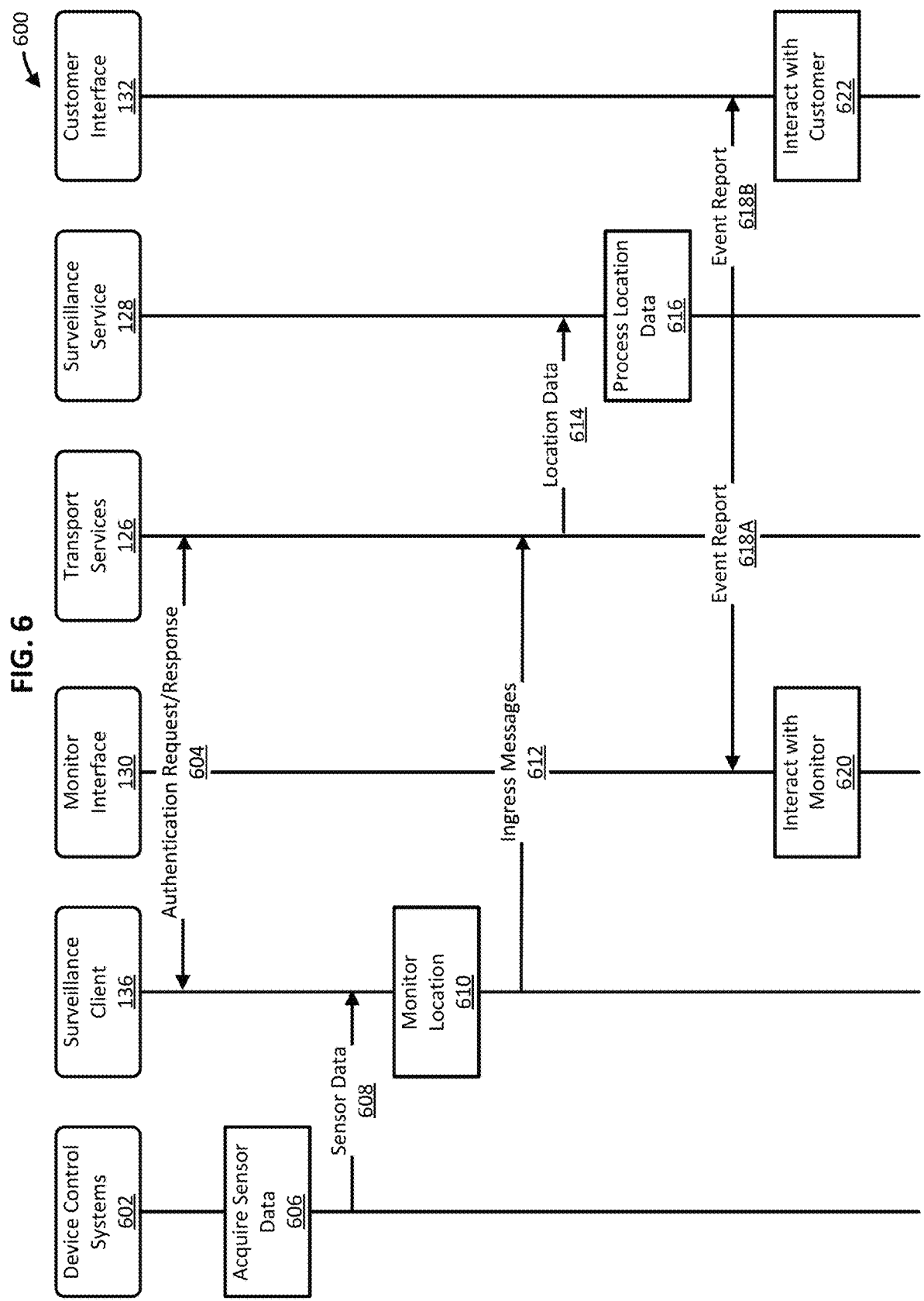
FIG. 6 is a sequence diagram of a monitoring process, according to some examples described herein.

Turning now to FIG. 6, a monitoring process 600 is illustrated as a sequence diagram. The process 600 can be executed, in some examples, by a security system (for example, the security system 100 of FIG. 1). More specifically, in some examples, at least a portion of the process 600 is executed by the location-based devices under the control of device control system (DCS) code (for example, either the code 308 or 408) implemented by at least one processor (for example, either of the processors 300 or 400 of FIG. 3-4C). The DCS code can include, for example, a camera agent (for example, the camera agent 138 of FIG. 1). At least a portion of the process 600 is executed by a base station (for example, the base station 114 of FIG. 1) under control of a surveillance client (for example, the surveillance client 136 of FIG. 1). At least a portion of the process 600 is executed by a monitoring center environment (for example, the monitoring center environment 120 of FIG. 1) under control of a monitor interface (for example, the monitor interface 130 of FIG. 1). At least a portion of the process 600 is executed by a data center environment (for example, the data center environment 124 of FIG. 1) under control of a surveillance service (for example, the surveillance service 128 of FIG. 1) or under control of transport services (for example, the transport services 126 of FIG. 1). At least a portion of the process 600 is executed by a customer device (for example, the customer device 122 of FIG. 1) under control of a customer interface (for example, customer interface 132 of FIG. 1).

As shown in FIG. 6, the process 600 starts with the surveillance client 136 authenticating with an identity provider (for example, the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (for example, the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (for example, 1 hour, 1 day, 1 week, 1 month, and so forth) after which the surveillance client 136 may be required to reauthenticate with the transport services 126.

Continuing with the process 600, one or more DCSs 602 hosted by one or more location-based devices acquire 606 sensor data descriptive of a location (for example, the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (for example, in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (for example, within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (for example, break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (for example, acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
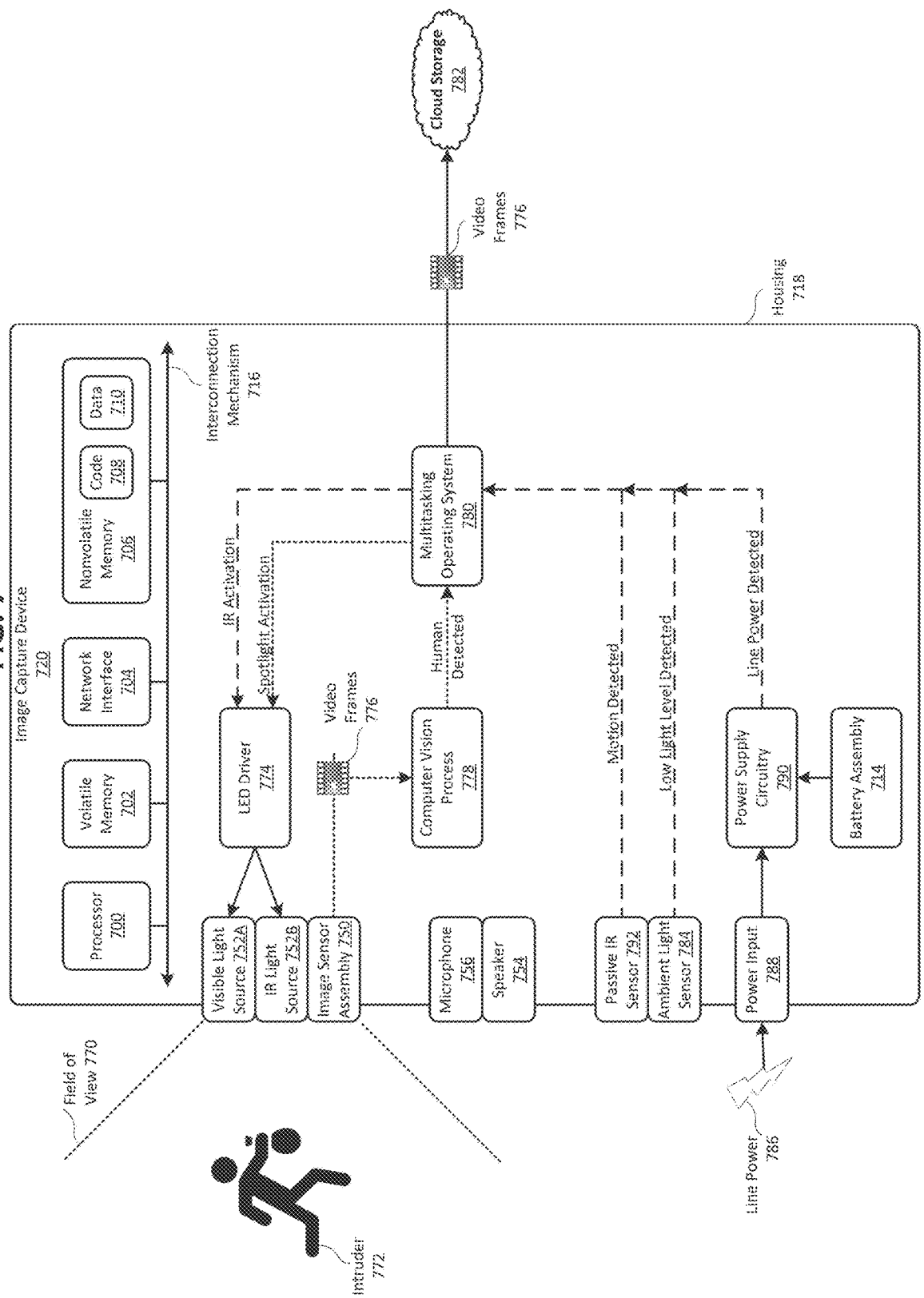
FIG. 7 is a schematic diagram of an image capture device that includes a visible light source and an infrared light source, and that is configured according to some examples described herein.

FIG. 7 is a schematic diagram of an image capture device 720 that includes a visible light source 752A and an infrared light source 752B, and that is configured according to some examples described herein. Particular configurations of image capture device 720 are illustrated in FIG. 1 and described above (see, for example, reference numerals 104 and 110 in FIG. 1). As shown in FIG. 7, image capture device 720 includes at least one processor 700, volatile memory 702, at least one network interface 704, nonvolatile memory 706, a battery assembly 714, and an interconnection mechanism 716. Nonvolatile memory 706 stores executable code 708 and a data store 710. Image capture device 720 further includes an image sensor assembly 750, a speaker 754, and a microphone 756 as described above with respect to image capture device 500 of FIG. 4B. In some implementations image capture device 720 further includes a passive infrared sensor 792 or other motion sensor that is capable of detecting motion in a field of view 770 even in the absence of any natural or artificial illumination source. As illustrated in FIG. 7, one or more of the components comprising image capture device 720 are incorporated within, or form part of, a housing 718.

As noted above, image capture device 720 includes both visible light source 752A and infrared light source 752B, either of which can provide illumination to field of view 770. For example, visible light source 752A provides a source of illumination that is visible to the naked human eye, such as can be provided by, for example, a red-green-blue light emitting diode. Visible light source 752A may also be referred to herein as a "spotlight". Infrared light source 752B, on the other hand, provides a source of illumination that is largely or completely invisible to the naked human eye, such as can be provided by an infrared light emitting diode. In alternative implementations another light source that provides illumination that is not visible to the naked human eye, but that uses electromagnetic radiation outside the infrared spectrum, is provided in place of infrared light source 752B.

Either visible light source 752A or infrared light source 752B can be used to illuminate field of view 770 during times when ambient light levels are too low to enable image sensor assembly 750 to capture usable images of, or detect motion in, field of view 770. In addition to serving as an illumination source for field of view 770, visible light source 752A also serves to put an intruder 772 on notice that he/she is under surveillance, as visible light source 752A will be readily apparent to intruder 772 once activated. Visible light source 752A also enables full-color imagery to be captured in low light conditions. Infrared light source 752B, on the other hand, will not be readily apparent to intruder 772, and thus can be used to provide covert surveillance of field of view 770. Infrared light source 752B enables black-and-white imagery to be captured in low light conditions.

In certain implementations image sensor assembly 752 comprises a lens and an image sensor, such as a charge coupled device or an active pixel sensor, that are collectively capable of capturing images of field of view 770. To facilitate such image capture, field of view 770 may be illuminated naturally (for example, with sunlight) or artificially (for example, with light generated by visible light source 752A or infrared light source 752B). In example implementations, image sensor assembly 752 is therefore capable of generating imagery of field of view 770 without respect to the particular source of illumination for field of view 770 at any given time. Likewise, in such implementations, image sensor assembly 752 is capable of adapting to changing ambient light levels and/or changing illumination sources, such as at dawn or dusk, to generate imagery of the field of view 770 without interruption. In certain implementations image sensor assembly 752 is capable of generating both individual still images and video clips comprising a sequence of video frames 776.

In some examples, image capture device 720 may include additional componentry to facilitate adaptation to different operating conditions. For example, and as alluded to above, in certain implementations image sensor assembly 752 is capable to adapting to changing ambient light levels. Thus, in such implementations image sensor assembly 752 optionally includes, or is operationally coupled to, an ambient light sensor 784, such as a phototransistor, a photodiode, or a photonic integrated circuit. Other types of sensor can be used in other implementations. Regardless of the particular technology used to detect ambient light levels, and as illustrated in FIG. 7, ambient light sensor 784 can be configured to provide an ambient light level signal to an operating system, such as multitasking operating system 780, which in turn controls an LED driver 774 that is coupled to visible light source 752A and infrared light source 752B. When ambient light levels fall below a designated threshold, such as at nightfall, multitasking operating system 780 is configured to activate an artificial light source, such as visible light source 752A or infrared light source 752B. On the other hand, when ambient light levels exceed the designated threshold, such as at daybreak, multitasking operating system 780 is configured to deactivate an active artificial light source.

Another component that enables image capture device 720 to adapt to changing operating conditions is power supply circuitry 790. In some implementations image capture device 720 can be configured to operate using either battery assembly 714 or a source of line power 786 that is connected to image capture device 720 via a power input 788 such as a universal serial bus (USB) port. For example, a portable power supply provided by battery assembly 714 allows image capture device 720 to be installed in locations where line power 786 is unavailable. A supply of line power 786 allows image capture device to operate in an essentially continuous fashion without need to replace or recharge batteries, and further allows image capture device 720 to invoke power-intensive operations that would make operating on battery power infeasible. Examples of such power-intensive operations include continual streaming of surveillance footage captured by image sensor assembly 750, or continual illumination of field of view 770 using an artificial illumination source (such as visible light source 752A and/or infrared light source 752B). In some cases, image capture device 720 may be configured to operate using a quasi-continuous power supply, such as provided by a solar array configured to convert solar radiation into electrical power is that is used power operations of image capture device 720, as well as to recharge a rechargeable battery that provides power during periods when sunlight is unavailable.

In certain implementations power supply circuitry 790 provides a power supply signal to an operating system, such as multitasking operating system 780, which in turn controls LED driver 774, which is coupled to visible light source 752A and infrared light source 752B. In such implementations, when line power 786 is available, and when ambient light levels are otherwise insufficient to enable image sensor assembly 752 to capture usable images of field of view 770, multitasking operating system 780 is configured to activate an artificial light source, such as visible light source 752A or infrared light source 752B. On the other hand, when line power 786 is unavailable, and image capture device 720 relies on battery assembly 714 to support operations, multitasking operating system 780 is configured to deactivate an active artificial light source, thereby extending battery life.

In certain implementations image capture device 750 includes a processor configured to perform computer vision processing 778 to detect motion and/or objects in the video frames generated by image sensor assembly 750. One type of object detection processing that is particularly useful in the context of security systems is detection of humanoid features, which is also sometimes referred to as person detection. Thus, in certain implementations video frames 776 generated by image sensor assembly 750 are analyzed by a processor using the computer vision process 778 to determine whether humanoid features are present in the captured frames; if so, computer vision processing 778 can be configured to provide a "human detected" signal to multitasking operating system 780. Receipt of this signal can affect operation of multitasking operating system 780, and in particular can affect how multitasking operating system 780 controls how field of view 770 is illuminated using LED driver 774. Additional details with respect to how multitasking operating system 780 controls LED driver 774 will be provided in turn. In addition, while this disclosure refers to certain implementations that provide or use human detection, humanoid detection, or person detection, in alternative implementations similar processes can be predicated on detection of non-human objects, such as pets, animals, vehicles, natural phenomena, weather phenomena, parcels, or other items or events of interest.

Multitasking operating system 780 can also be configured to transmit video frames 776 via network interface 704 to other components of a security system, such as security system 100 illustrated in FIG. 1. For example, in some implementations video frames 776 are transmitted to cloud storage 782, data center environment 124, monitoring center environment 120, and/or one or more customer devices 122. In some cases, decisions about when and where video frames 776 are transmitted depends on the output of computer vision processing 778. For example, in certain implementations multitasking operating system 780 is configured to transmit a video clip in which a humanoid figure is detected to monitoring center environment 120 for further analysis, and possibly for forwarding to one or more customer devices 122. In other implementations such a video clip is transmitted directly to one or more customer devices 122.

Figure 8:
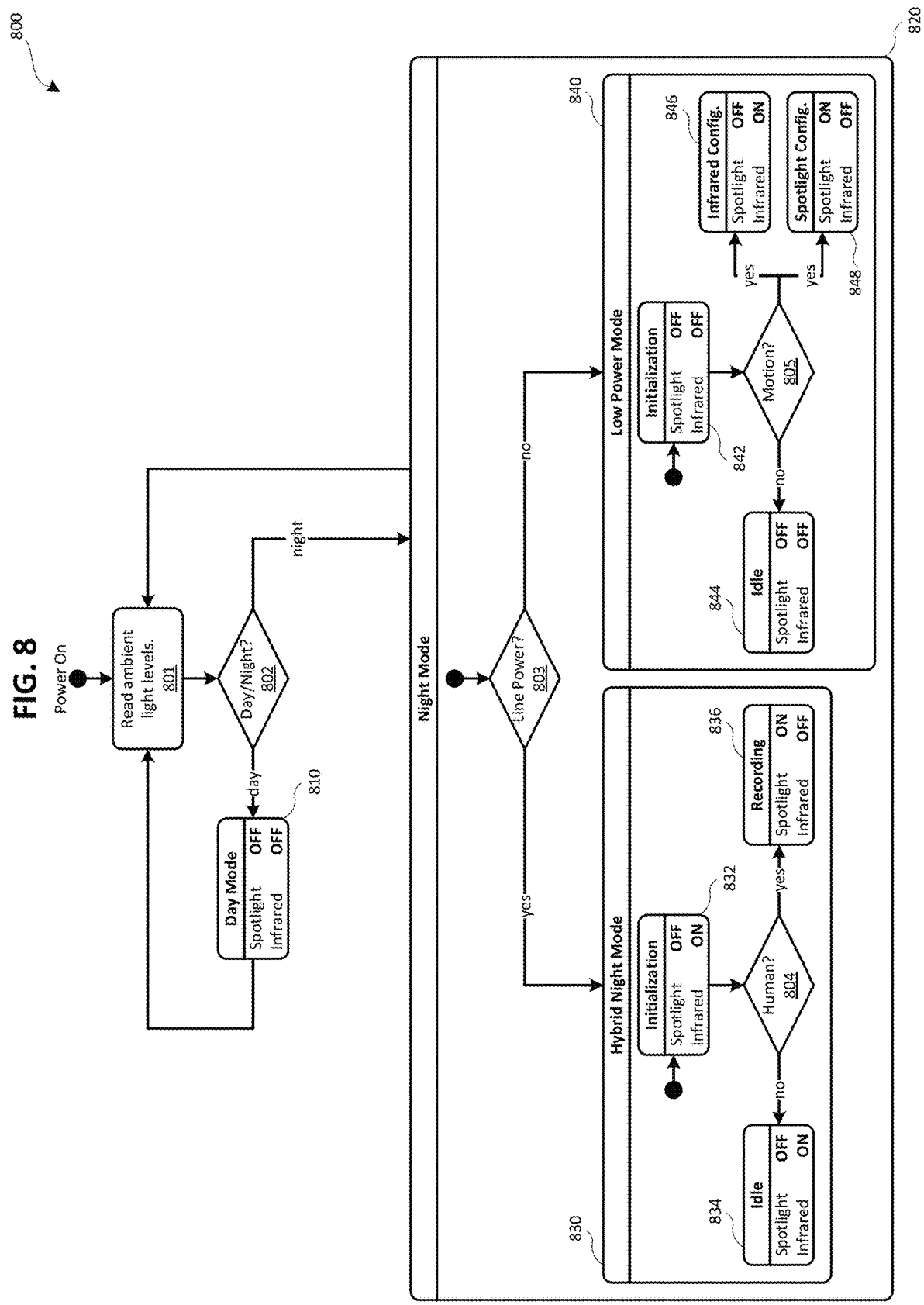
FIG. 8 is a block diagram schematically illustrating operational modes that can be implemented using an image capture device configured according to some examples described herein.

FIG. 8 is a block diagram schematically illustrating certain operational modes 800 that can be implemented using an image capture device configured according to some examples described herein. For example, operational modes 800 illustrated in FIG. 8 can be implemented using image capture device 720 illustrated in FIG. 7. As illustrated in FIG. 8, when image capture device 720 is powered on or is otherwise initialized for use, ambient light sensor 784 is configured to read ambient light levels at field of view 770 (see reference numeral 801 in FIG. 8). A determination is made with respect to whether a sensed ambient light level falls below or exceeds a designated threshold (see reference numeral 802 in FIG. 8). In general, ambient light levels will be understood to exceed the threshold during daytime, and thus will correspond to "day" operational mode 810. Likewise, ambient light levels will be understood to fall below the threshold during nighttime, and thus will correspond to "night" operational mode 820. However, while the "day" and "night" labels are used as a shorthand for operational modes that are invoked during periods of time when ambient light levels are high or low, respectively, it should be appreciated that such operational modes are not necessarily associated with or otherwise assigned certain time periods. Thus, an image capture device might operate in "night" operational mode 820 when ambient light levels are unusually low during daytime (such as during periods of heavy overcast), or might operate in "day" operational mode 810 when ambient light levels are usually high during nighttime (such as when an external light source illuminates field of view 770).

When ambient light sensor 784 detects ambient light levels above the designated threshold, image capture device 720 operates in "day" operational mode 810. In "day" operational mode 810, no external illumination of field of view 770 is required for image sensor assembly 750 to adequately generate imagery of field of view 770, and therefore both visible light source 752A and infrared light source 752B are turned off. This can be accomplished, for example, when multitasking operating system 780 causes LED driver 774 to send appropriate control signals to visible light source 752A and infrared light source 752B. Image capture device 720 will continue operating in "day" operational mode 810 until ambient light sensor 784 detects an ambient light level that falls below the designated threshold. For example, in one implementation "day" operational mode 810 is invoked when ambient light levels exceed 500 lux, while "night" operational mode 820 is invoked when ambient light levels fall below 375 lux. In alternative implementations, light thresholds such as these are used in combination with an average brightness value for pixels reaching image sensor assembly 750.

When ambient light sensor 784 detects ambient light levels below the designated threshold, image capture device 720 operates in "night" operational mode 820. In "night" operational mode 820, supplemental illumination of field of view 770 can be provided to enable image sensor assembly 750 to adequately generate imagery of field of view 770. Once in "night" operational mode 820, a determination is made with respect to whether image capture device 720 is supplied with line power 786 (see reference number 803 in FIG. 8). This determination can be made, for example, based on a signal provided by power supply circuitry 790, as described above. In some cases, image capture device 720 is considered to be supplied with line power 786 when powered by a rechargeable battery connected to a solar array or other power source. In other cases, image capture device 720 is considered to be supplied with line power 786 only when connected to an uninterruptable line power supply via power input 788. When image capture device 720 is operating in low ambient light levels and is connected to line power 786, a "hybrid night" operational mode 830 is invoked. When image capture device 720 is operating in low ambient light levels and is not connected to line power 786, a "low power" operational mode 840 is invoked.

In "hybrid night" operational mode 830, image capture device 720 can take advantage of the uninterrupted supply of line power 786 to provide uninterrupted illumination of field of view 770. Thus, once "hybrid night" operational mode 830 is invoked, either visible light source 752A or infrared light source 752B is turned on in an "initialization" operational sub-mode 832, as illustrated in FIG. 8. In some cases, the light source that is turned on upon entering "hybrid night" operational mode 830 depends on a user-specified configuration setting. In other cases, such as illustrated in FIG. 8, the light source that is turned on upon entering "hybrid night" operational mode 830 is set to infrared light source 752B as a fixed default. Infrared light source 752B has the advantage of providing covert surveillance of field of view 770, and may be considered to be more subtle or less disruptive than continuous use of visible light source 752A. In general, only one light source is required to illuminate field of view 770, so that an image capture device having two light sources, such as image capture device 720 illustrated in FIG. 7, can be configured to activate only one light source when operating in "night" operational mode 820.

In "hybrid night" operational mode 830, a determination is made with respect to whether computer vision processing 778 detects presence of a humanoid figure in field of view 770 (see reference numeral 804 in FIG. 8). Where no humanoid figure is detected, image capture device 720 can operate in an "idle" operational sub-mode 834 within "hybrid night" operational mode 830. This may continue until, for example, a humanoid figure is detected in field of view 770, line power 786 is terminated, or ambient light levels exceed the designated threshold for operating in "night" operational mode 820.

Where computer vision processing 778 detects presence of a humanoid figure, image capture device 720 can be configured to operate in a "recording" operational sub-mode 836 within "hybrid night" operational mode 830. In "recording" operational sub-mode 836, multitasking operating system 780 is configured to generate a recording of the humanoid figure entering and/or present in field of view 770. The generated recording may include footage recorded before the presence of the humanoid figure is detected; such footage is referred to herein as "pre-roll footage". The length of the pre-roll footage may be user configurable, and may depend at least in part on the size of a buffer used to store the pre-roll footage. Capturing pre-roll footage using infrared illumination increases the likelihood that intruder 772 is detected by image capture device 720 before intruder 772 detects image capture device 772.

In some implementations, invoking "recording" operational sub-mode 836 may cause infrared light source 752B to be turned off, and may further cause visible light source 752A to be turned on. This alerts intruder 772 to the presence of image capture device 720, thus providing a possible deterrent effect. Further, because the generated recording, which includes the aforementioned pre-roll footage, will encompass the point at which visible light source 752A is turned on, the intruder's response to such illumination can be recorded and observed, which may provide insight into the intruder's motive and/or intent. The pre-roll footage also provides an opportunity to observe the intruder's actions before the intruder is aware of the ongoing surveillance. The recording may continue, for example, until intruder 772 is no longer present in field of view 770. As described above with respect to FIG. 7, recorded video frames, including the pre-roll footage, may be transmitted to cloud storage 782, data center environment 124, monitoring center environment 120, and/or one or more customer devices 122.

As disclosed previously, and as further illustrated in FIG. 8, when image capture device 720 is operating in low ambient light levels and is not connected to line power 786, "low power" operational mode 840 is invoked. In "low power" operational mode 840, image capture device 720 can turn off all illumination sources and can refrain from recording pre-roll footage to extend battery line. Thus, once "low power" operational mode 840 is invoked, any active illumination sources, such as visible light source 752A or infrared light source 752B, are turned off in an "initialization" operational sub-mode 842. In certain implementations, these illumination sources remain turned off until motion is detected in field of view 770. In "low power" operational mode 840, motion detection can be accomplished using, for example, passive infrared sensor 792.

Thus, in "low power" operational mode 840, a determination is made with respect to whether motion is detected in field of view 770 (see reference numeral 805 in FIG. 8). Where no motion is detected, image capture device 720 can operate in an "idle" operational sub-mode 844 within "low power" operational mode 840. This may continue until, for example, motion and/or a humanoid is detected in field of view 770, line power 786 is connected, or ambient light levels exceed the designated threshold for operating in "night" operational mode 820.

Where motion is detected in field of view 770 while in "low power" operational mode 840, image capture device 720 can be configured to turn on an illumination source and begin recording footage of the detected motion. In certain implementations, the particular illumination source that is activated depends on a user-specified configuration setting. For example, in an infrared configuration 846, visible light source 752A is turned off (if not already off), and infrared light source 752B is turned on (if not already on). Likewise, in a spotlight configuration 848, visible light source 752A is turned on (if not already on), and infrared light source 752B is turned off (if not already off). In other implementations, the light source that is turned on upon detecting motion in "low power" operational mode 840 is set to visible light source 752A as a fixed default. Visible light source 752A advantageously puts intruder 772 on notice that they are under surveillance, which can provide a deterrent effect to nefarious activity. Infrared light source 752B, on the other hand, has the advantage of providing covert surveillance of field of view 770, and may be considered to be more subtle than continuous or frequent use of visible light source 752A. After motion is detected in "low power" operational mode 840, and after an appropriate illumination source is activated, the illumination source may remain active for a specified period of time that is either user-configurable or specified by default. In other implementations the illumination source remains active until motion and/or a humanoid is no longer detected in field of view 770.

In an alternative implementation, detecting motion using passive infrared sensor 792 causes a processor, such as a system-on-chip processor, to power on and execute an ambient light detection algorithm based on input from ambient light sensor 784. If ambient light levels are below a designated threshold, and user configuration settings allow an artificial illumination source to be activated, then either visible light source 752A or infrared light source 752B are activated, for example based on a user-defined configuration setting. If, on the other hand, ambient light levels are above the designated threshold, or if user configuration settings forbid use of artificial illumination (for example, as might be specified pursuant to a battery conservation mode), no artificial illumination is activated. Where artificial illumination is provided, computer vision process 778 can then determine if any humanoid figures are detected in captured images. The captured images can then be saved to an appropriate location and/or may serve as the basis for subsequent notifications. If no humanoid figures are detected, then any artificial illumination can be turned off and the system-on-chip processor can be powered off or otherwise placed in an idle mode. In general, when the system-on-chip processor is idle, background processes such as computer vision process 778 and multitasking operating system 780 are powered down until receipt of a subsequent trigger from passive infrared sensor 792.

FIG. 9 is a sequence diagram of a monitoring process 900 that can be implemented using an image capture device configured according to some examples described herein. Monitoring process 900 can be executed, in some examples, by a security system such as security system 100 illustrated in FIG. 1. More specifically, in some examples, at least a portion of monitoring process 900 is executed by computer vision process 778 and multitasking operating system 780 that are integrated into image capture device 720.

Monitoring process 900 starts when a user 910 turns on image capture device 720 (see reference numeral 901 in FIG. 9), for example by connecting image capture device 720 to line power 786 (see reference numeral 902 in FIG. 9). In response to detecting availability of line power 786, multitasking operating system 780 can be configured to start recording video frames 776 captured by image sensor assembly 750 (see reference numeral 903 in FIG. 9). In certain implementations the recorded video frames 776 are stored in a pre-roll buffer of designated size. The pre-roll buffer can be implemented using volatile memory 702 and/or nonvolatile memory 706. When the pre-roll buffer becomes full of recorded video frames 776, then a portion of the oldest video frames can be deleted from the pre-roll buffer, thereby providing space for additional recorded video frames 776 to be stored. This process can be repeated continually, such that the pre-roll buffer always provides n seconds of most-recently-recorded video frames 776. In general, the length of the pre-roll footage may be user configurable, and in certain implementations n=2 seconds, 5 seconds, 10 seconds, 15 seconds, 20 seconds, 25 seconds, 30 seconds, 45 seconds, 60 seconds, 90 seconds, 120 seconds, 150 seconds, 180 seconds, 240 seconds, or 300 seconds of pre-roll footage. Other or intermediate lengths of pre-roll footage may be stored in other implementations. In some implementations the length of the pre-roll footage is dynamically adjusted based on operational criteria and/or user preferences.

As described above with reference to FIG. 8, when detected ambient light levels exceed a designated threshold, image capture device 720 may operate in "day" operational mode 810. In "day" operational mode, no supplemental illumination source is used. At some point, intruder 772 may enter field of view 770 (see reference numeral 922 in FIG. 9), in response to which computer vision process 778 may detect a humanoid figure (that is, at least a portion of intruder 772) in one or more of video frames 776 captured by image sensor assembly 750 (see reference numeral 923 in FIG. 9). In certain implementations multitasking operating system 778 responds to the humanoid detection by creating a video clip that begins a designated period of time before the humanoid was detected. This is accomplished by extracting an appropriate quantity of video frames 776 from pre-roll buffer, and using the extracted video frames to begin the video clip. This enables the creation of a video clip that shows intruder 772 entering field of view 770. Additional actions are optionally invoked in response to detecting intruder 772 having entered field of view 770, such as sending a notification to one or more of data center environment 124, monitoring center environment 120, and/or one or more customer devices 122.

At some point, intruder 772 may leave field of view 770 (see reference numeral 924 in FIG. 9), in response to which computer vision process 778 detects that a humanoid figure is no longer present in video frames 776 captured by image sensor assembly 750. In such case, computer vision process 778 notifies multitasking operating system 780 that the humanoid figure has the left field of view 770 (see reference number 925 in FIG. 9), in response to which multitasking operating system 780 saves the previously created video clip (see reference numeral 926 in FIG. 9). For example, in certain implementations this results in a video clip that begins before intruder 772 enters the field of view 770, and ends after intruder 772 leaves the field of view 770. As described above with respect to FIG. 7, recorded video frames may be transmitted to cloud storage 782, data center environment 124, monitoring center environment 120, and/ or one or more customer devices 122.

As described above with respect to FIG. 8, when detected ambient light levels fall below the aforementioned designated threshold, and when line power 786 is connected, image capture device 720 may operate in "hybrid night" operational mode 830. In "hybrid night" operational mode 830, image capture device 720 can take advantage of the uninterrupted supply of line power 786 to provide uninterrupted illumination of field of view 770, and in turn, uninterrupted recording of pre-roll footage that can be used in the future creation of video clips. Thus, in certain implementations, once "hybrid night" operational mode 830 is invoked, infrared light source 752B is activated (see reference numeral 931 in FIG. 9).

At some point, intruder 772 may enter the field of view 770 (see reference numeral 932 in FIG. 9), in response to which computer vision process 778 may detect a humanoid figure (that is, at least a portion of intruder 772) in one or more of video frames 776 captured by image sensor assembly 750 (see reference numeral 933 in FIG. 9). In certain implementations multitasking operating system 778 responds to the humanoid detection by creating a video clip that begins a designated period of time before the humanoid was detected. This is accomplished by extracting an appropriate quantity of video frames 776 from pre-roll buffer, and using the extracted video frames to begin the video clip. For example, in one implementation one or more of video frames 776 are associated with a presentation timestamp that increments from a starting point (for example, zero seconds) when multitasking operating system 780 is powered on and frame collection begins. When image capture device 720 begins recording, the initial value of the presentation timestamp is acquired and a pre-roll duration is subtracted from this initial value. Video frames recorded after that point can be uploaded to, for example, data center environment 124. In the event that the pre-roll duration is greater than an uptime of image capture device 720, then all frames in the buffer may be uploaded.

This enables the creation of a video clip that shows intruder 772 entering the field of view 770. In such implementations infrared light source 752B provides sufficient illumination to record video frames 776, and such frames can be recorded covertly vis-à-vis intruder 772 since infrared light source 752B will generally by invisible to intruder 772. Additional actions are optionally invoked in response to detecting intruder 772 having entered the field of view 770, such as sending a notification to one or more of data center environment 124, monitoring center environment 120, and/or one or more customer devices 122.

At some point, intruder 772 may leave field of view 770 (see reference numeral 934 in FIG. 9), in response to which computer vision processing 778 detects that a humanoid figure is no longer present in video frames 776 captured by image sensor assembly 750. In such case, computer vision processing 778 notifies multitasking operating system 780 that the humanoid figure has left field of view 770 (see reference number 935 in FIG. 9), in response to which multitasking operating system 780 saves the previously created video clip (see reference numeral 936 in FIG. 9). For example, in certain implementations this results in a video clip that begins before intruder 772 enters the field of view 770, and ends after intruder 772 leaves the field of view 770. As described above with respect to FIG. 7, recorded video frames may be transmitted to cloud storage 782, data center environment 124, monitoring center environment 120, and/or one or more customer devices 122. As illustrated in FIG. 9, infrared light source 752B may remain active until detected ambient light levels exceed a designated threshold (for example, until daytime), or until line power 786 is no longer available.

While use of infrared light source 752B in "hybrid night" operational mode 830 enables covert observation of intruder 772, in some cases it may be desired to make intruder 772 aware of the ongoing active surveillance. Thus, as further illustrated in FIG. 9, "hybrid night" operational mode 830 can alternatively be invoked using both infrared illumination (as an initial illumination source) and spotlight illumination (as a supplemental illumination source). Thus, infrared light source 752B is initially activated (see reference numeral 941 in FIG. 9) when detected ambient light levels fall below the aforementioned designated threshold. At some point, intruder 772 enters the field of view 770 (see reference numeral 942 in FIG. 9), in response to which computer vision processing 778 detects a humanoid figure (that is, at least a portion of intruder 772) in one or more of video frames 776 captured by image sensor assembly 750 (see reference numeral 943 in FIG. 9).

In this case, computer vision process 778 notifies multitasking operating system 780 of the detected humanoid (see reference numeral 944 in FIG. 9). Multitasking operating system 780 responds to this notification by controlling LED driver 774 to turn off infrared light source 752B (see reference numeral 945 in FIG. 9) and turn on visible light source 752A (see reference numeral 946 in FIG. 9). This makes an observant intruder 772 aware of the active surveillance, which can provide a deterrent effect to untoward activity. Multitasking operating system 778 may also respond to the humanoid detection by creating a video clip that begins a designated period of time before the humanoid was detected. This is accomplished by extracting an appropriate quantity of video frames 776 from pre-roll buffer, and using the extracted video frames to begin the video clip. For example, in one implementation one or more of video frames 776 are associated with a presentation timestamp that increments from a starting point (for example, zero seconds) when multitasking operating system 780 is powered on and frame collection begins. When image capture device 720 begins recording, the initial value of the presentation timestamp is acquired and a pre-roll duration is subtracted from this initial value. Video frames recorded after that point can be uploaded to, for example, data center environment 124. In the event that the pre-roll duration is greater than an uptime of image capture device 720, then all frames in the buffer may be uploaded.

This enables the creation of a video clip that not only shows intruder 772 entering the field of view 770, but that also shows how the intruder responds, if at all, to activation of visible light source 752A, which may provide insight into the intruder's motive and/or intent. For example, the intruder may respond by turning to face visible light source 152A (and therefore image capture device 720), by fleeing the scene, or by ignoring the activation of visible light source 752A. Additional actions are optionally invoked in response to detecting intruder 772 having entered field of view 770, such as sending a notification to one or more of data center environment 124, monitoring center environment 120, and/or one or more customer devices 122.

In some implementations computer vision process 778 can further analyze how intruder 772 responds to activation of visible light source 752A. In particular, activation of visible light source 752A may serve as the first indication to intruder 772 of the active surveillance. In many cases, the intruder's natural reaction to the unanticipated activation of visible light source 752A will be to turn toward the camera. This can facilitate capturing an image of the intruder's face, which can in turn support facial recognition operations. For example, if the intruder's face is recognized as a trusted individual, then subsequent notifications can be eliminated or delivered silently. On the other hand, if the intruder is not recognized, then subsequent notifications can be prioritized or delivered with a higher degree of urgency. In certain implementations other intruder reactions can be automatically detected and reported, such as if an intruder were to run away from the camera or otherwise quickly leave field of view 770.

At some point, intruder 772 may leave the field of view 770 (see reference numeral 947 in FIG. 9), in response to which computer vision process 778 detects that a humanoid figure is no longer present in video frames 776 captured by image sensor assembly 750. In such case, computer vision process 778 notifies multitasking operating system 780 that the humanoid figure has left field of view 770 (see reference number 948 in FIG. 9), in response to which multitasking operating system 780 controls LED driver 774 to turn off visible light source 752A (see reference numeral 949 in FIG. 9) and turn on infrared light source 752B (see reference numeral 950 in FIG. 9). Multitasking operating system 780 may also save the previously created video clip (see reference numeral 951 in FIG. 9). For example, in certain implementations this results in a video clip that begins before intruder 772 enters field of view 770, that shows how intruder 772 responds to activation of visible light source 752A, and that ends after intruder 772 leaves field of view 770. As described above with respect to FIG. 7, recorded video frames may be transmitted to cloud storage 782, data center environment 124, monitoring center environment 120, and/or one or more customer devices 122. As illustrated in FIG. 9, infrared light source 752B may remain active until detected ambient light levels exceed a designated threshold (for example, until daytime), or until line power 786 is no longer available.

Figure 10A:
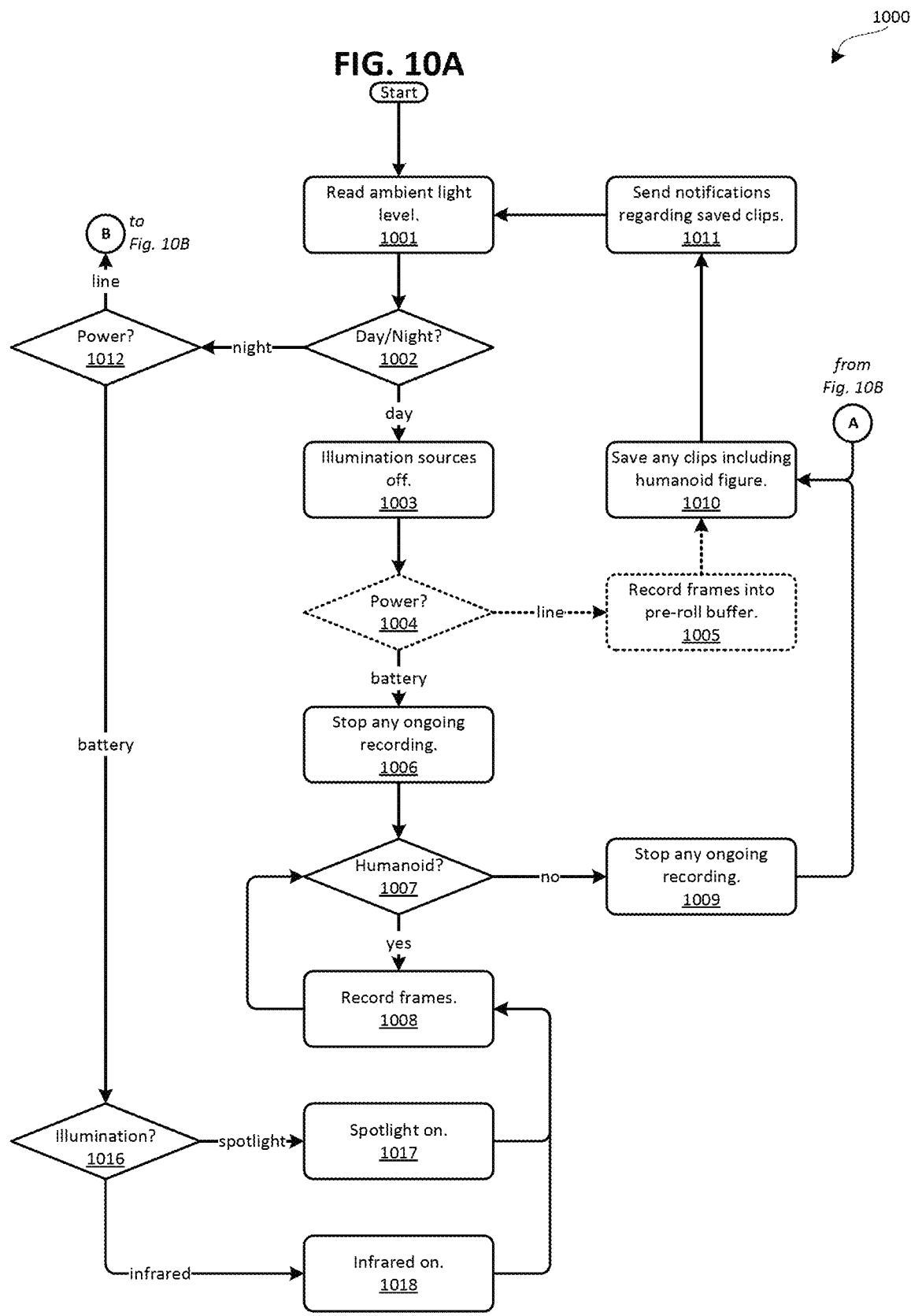

FIGS. 10A and 10B are a flowchart illustrating a monitoring process 1000 that can be implemented using an image capture device configured according to some examples described herein. For example, monitoring process 1000 can be implemented using image capture device 720 illustrated in FIG. 7 and described herein, and using functionality provided by the various operational modes 800 that are schematically illustrated in FIG. 8. However other system architectures can be used in other implementations. To this end, the correlation of the various functionalities shown in FIGS. 10A and 10B to the various components of image capture device 720 and the various operational modes 800 is not intended to imply any structural and/or use limitations. Rather, other implementations may include, for example, varying degrees of integration wherein certain functionalities are effectively performed by different systems or modules. Thus, other implementations may have fewer or more components and/or operational modes depending on the granularity of a particular implementation. As can be seen, monitoring process 1000 includes a number of phases and subprocesses, the sequence of which may vary from one implementation to another. However, when considered in the aggregate, these phases and subprocess are capable of providing surveillance of a field of view under different operating conditions, such as under different ambient light levels or using different power sources.

In one implementation, monitoring process 1000 starts when ambient light sensor 784 reads ambient light levels in the environment where image capture device 720 is located, and in particular implementations, more specifically in a field of view provided by image capture device 720 (see reference numeral 1001 in FIG. 10A). Based on this reading, a determination can be made with respect to whether image capture device 720 will operate in "day" operational mode 810 or "night" operational mode 820 (see reference numeral 1002 in FIG. 10A). While the "day" and "night" labels are used in this context as a shorthand for operational modes that are invoked during periods of time when ambient light levels are high or low, respectively, it should be appreciated that such operational modes are not necessarily associated with or otherwise assigned to certain time periods. Thus, an image capture device might operate in "night" operational mode 820 when ambient light levels are unusually low during daytime (such as during periods of heavy overcast), or might operate in "day" operational mode 810 when ambient light levels are usually high during nighttime (such as when an external light source illuminates field of view 770).

When ambient light sensor 784 detects ambient light levels above a designated threshold, image capture device 720 operates in "day" operational mode 810. In this case, all artificial illumination sources are switched off, if such sources are not already switched off (see reference numeral 1003 in FIG. 10A). Examples of artificial illumination sources include visible light source 752A and infrared light source 752B.

Optionally, as indicated by the broken lines in FIG. 10A, a determination can be made with respect to whether image capture device 720 is receiving power from battery assembly 714 or line power 786 (see reference number 1004 in FIG. 10A). Where line power 786 is available, video frames can be continually captured and recorded into a pre-roll buffer (see reference numeral 1005 in FIG. 10A). As described above, when the pre-roll buffer becomes full of recorded video frames 776, then a segment of the oldest video frames can be deleted from the pre-roll buffer, thereby providing space for additional recorded video frames 776 to be stored. This process can be repeated continually, such that the pre-roll buffer always provides a duration of most-recently-recorded video frames 776.

Where image capture device 720 receives power from battery assembly 714, or when continual video recording is disabled regardless of power supply, any ongoing video recordings are terminated (see reference numeral 1006 in FIG. 10A). Ongoing video recordings may exist, for example, due to image capture device 720 having just been disconnected from line power 786. A determination can then be made, for example using computer vision processing 778, whether a humanoid figure is detected within field of view 770 (see reference numeral 1007 in FIG. 10A). In some cases, computer vision processing 778 is activated in response to passive infrared sensor 792 detecting motion and causing image sensor assembly 750 to collect one or more images of field of view 770 upon which object detection is performed.

Where computer vision processing 778 detects a humanoid figure, a video clip is created by recording frames captured by image sensor assembly 750 (see reference number 1008 in FIG. 10A). Such recording may continue until the humanoid figure is no longer visible in the captured video frames, at which point the recording ends (see reference numeral 1009 in FIG. 10A). The recorded video clip can be saved, for example, to cloud storage 782 (see reference numeral 1010 in FIG. 10A). Additional actions are optionally invoked in response to detecting intruder 772 having entered field of view 770, such as sending a notification to one or more of data center environment 124, monitoring center environment 120, and/or one or more customer devices 122 (see reference numeral 1011 in FIG. 10A).

As described above, monitoring process 1000 starts when ambient light sensor 784 reads ambient light levels and a determination is made with respect to whether image capture device 720 will operate in "day" operational mode 810 or "night" operational mode 820. When ambient light sensor 784 detects ambient light levels below a designated threshold, image capture device 702 operates in "night" operational mode 820. In this case, a further determination is made with respect to whether image capture device 720 is receiving power from battery assembly 714 or line power 786 (see reference number 1012 in FIG. 10A). For example, in one implementation, when a designated pin of a power cable (for example, a power pin of a universal serial bus cable) connected to line power 786 provides at least 100 mA of current, the cable is enumerated by multitasking operating system 780. When this condition is satisfied a memory address is toggled from an "off" state to an "on" state (for example, from binary 0 to binary 1). This memory address can be polled periodically (for example, every 20 ms) and any changes in state can be propagated to the multitasking operating system 780.

Wherein image capture device 720 receives power from battery assembly 714, all artificial illumination sources are switched off as an initial operating state, if such sources are not already switched off.

A determination can be made, for example using passive infrared sensor 792, whether motion is detected within field of view 770. If a humanoid figure is not detected, ambient light levels can be reevaluated and image capture device 720 can be reconfigured as disclosed herein.

On the other hand, if motion is detected, then an illumination source is activated to enable recording of a possible intruder. In some cases, the particular illumination source that is used may be hardcoded in advance or otherwise specified as a fixed default. In other implementations, the particular illumination source that is used may depend on a user-defined configuration setting. In such implementations a determination is made with respect to which illumination source is specified in the user-defined configuration setting (see reference numeral 1016 in FIG. 10A). Where the user-defined configuration setting specifies that visible light source 752A is to be used to illuminate the field of view 770 in response to humanoid detection while operating on battery power in "night" operational mode 820, then visible light source 752A is activated (see reference numeral 1017 in FIG. 10A). If, on the other hand, the user-defined configuration setting specifies that infrared light source 752B is to be used to illuminate the field of view 770 in response to humanoid detection while operating on battery power in "night" operational mode 820, then infrared light source 752B is activated (see reference numeral 1018 in FIG. 10A). Once field of view 770 is illuminated with the specified illumination source, video frames can be recorded and processed as described above with respect to "day" operational mode 810.

Turning now to FIG. 10B, when detected ambient light levels fall below the aforementioned designated threshold, and when line power 786 is connected, image capture device 720 may operate in "hybrid night" operational mode 830. In "hybrid night" operational mode 830, image capture device 720 can take advantage of the uninterrupted supply of line power 786 to provide uninterrupted illumination of field of view 770 and continual recording of video frames into a pre-roll buffer. Thus, in certain implementations, once "hybrid night" operational mode 830 is invoked, infrared light source 752B is activated (see reference numeral 1019 in FIG. 10B). In this case, video frames can be continually captured and recorded into a pre-roll buffer (see reference numeral 1020 in FIG. 10B). As described above, when the pre-roll buffer becomes full of recorded video frames 776, then a segment of the oldest video frames can be deleted from the pre-roll buffer, thereby providing space for additional recorded video frames 776 to be stored. This process can be repeated continually, such that the pre-roll buffer always provides a duration of most-recently-recorded video frames 776.

A determination can then be made, for example using computer vision processing 778, whether a humanoid figure is detected within field of view 770 (see reference numeral 1021 in FIG. 10B). Computer vision process 778 can make this determination by analyzing frames captured by image sensor assembly 750 during recording of the pre-roll footage. If a humanoid figure is detected, infrared light source 752B is turned off and visible light source 752A is turned on (see reference numeral 1023 in FIG. 10B). This puts any intruder 772 on notice of the active surveillance, and may further provide a deterrent effect toward nefarious activity by intruder 772. Visible light source 752B also provides an illumination source for higher-quality video recording as compared to video recording supported by infrared illumination.

At some point, intruder 772 may leave field of view 770, in response to which computer vision processing 778 detects that a humanoid figure is no longer present in video frames 776 captured by image sensor assembly 750. In such case, computer vision processing 778 notifies multitasking operating system 780 that the humanoid figure has left field of view 770. Multitasking operating system 780 can then control LED driver 774 to turn off visible light source 752A and turn on infrared light source 752B (see reference numeral 1022 in FIG. 10B). A recorded video clip can then be saved, for example, to cloud storage 782 (see reference numeral 1010 in FIG. 10A). Such recording may include pre-roll footage recorded before the humanoid figure was first detected. This inclusion of pre-roll footage is made possible by continually recording footage of field of view 770 into a pre-roll buffer of designated size once "hybrid night" operational mode 830 is invoked. Because the generated recording, which includes the aforementioned pre-roll footage, will encompass the point at which visible light source 752A is turned on, the intruder's response to such illumination can be recorded and observed, which may provide insight into the intruder's motive and/or intent. The recording may continue, for example, until intruder 772 is no longer present in field of view 770. As described above with respect to FIG. 7, recorded video frames may be transmitted to cloud storage 782, data center environment 124, monitoring center environment 120, and/or one or more customer devices 122. Additional actions are optionally invoked in response to detecting intruder 772 having entered field of view 770, such as sending a notification to one or more of data center environment 124, monitoring center environment 120, and/or one or more customer devices 122 (see reference numeral 1011 in FIG. 10A).

Invoking "hybrid night" operational mode 830 when image capture device 720 is operating in low light conditions with line power 786 advantageously allows the active illumination source to be selected based on changing conditions, and in particular, in response to detecting objects of interest, such as intruder 772, in field of view 770. For example, in certain implementations use of visible light source 752A is limited to recording or streaming video frames when the object of interest is present in field of view 770. Continuous use of visible light source 752A can make image capture device 720 apparent at all times, which may prevent covert surveillance and which may be disruptive in certain applications (such as a home security environment). At the same time, use of infrared light source 752B allows illuminated frames to be captured as the object of interest enters field of view 770, thus not only enabling computer vision object detection, but also enabling the capture of pre-roll footage showing the object of interest entering field of view 770. Additionally, using computer vision processing 778 to determine when the recorded pre-roll footage should be saved into a recorded video clip reduces false positives as compared to relying solely on passive infrared sensor 792. Indeed, in some implementations passive infrared sensor 792 is omitted and computer vision processing 778 is relied upon for motion and/or object detection. In any event, "hybrid night" operational mode 830 balances subtlety with deterrence in the surveillance context by toggling between an invisible illumination source and a visible illumination source based on the results of a computer vision process. In particular, a preferred illumination source can be selected based on inputs that image capture device 720 itself is able to provide.

While the "object of interest" will often refer to humanoid detection, it will be appreciated that the various implementations disclosed herein can be predicated on detection of non-human objects, such as pets, animals, vehicles, natural phenomena, weather phenomena, parcels, or other items or events of interest.

Figure 11:
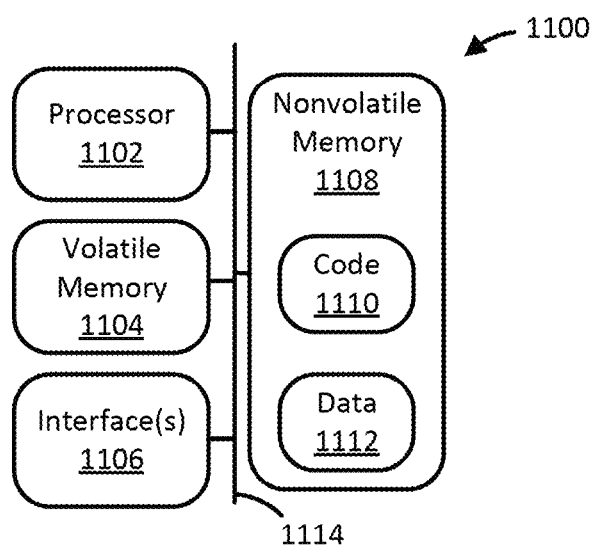
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, nonvolatile memory 1108, and an interconnection mechanism 1114. The nonvolatile memory 1108 includes code 1110 and at least one data store 1112.

In some examples, the nonvolatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the nonvolatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (for example, the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the nonvolatile memory 1108 to the volatile memory 1104. In some examples, the volatile memory 1104 includes one or more static or dynamic random access memory (RAM) chips and/or cache memory (for example memory disposed on a silicon die of the processor 1102). Volatile memory 1104 can offer a faster response time than a main memory, such as the nonvolatile memory 1108.

Through execution of the code 1110, the processor 1102 can control operation of the interfaces 1106. The interfaces 1106 can include network interfaces. These network interfaces can include one or more physical interfaces (for example, a radio, an ethernet port, a USB port, and so forth) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (for example, a keyboard, a mouse, a touchscreen, a display, a speaker, a camera, an accelerometer, a biometric scanner, an environmental sensor, and so forth) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising: illuminating an area using an infrared light source; while the area is illuminated using the infrared light source, capturing one or more images of the area; analyzing the one or more images to identify an object in the area; and after identifying the object, illuminating the area using a visible light source.

Example 2 includes the subject matter of Example 1, wherein: the infrared light source and the visible light source receive power from power supply circuitry; and the power supply circuitry is capable of receiving power from a battery and an external power source.

Example 3 includes the subject matter of Example 1, wherein: the infrared light source and the visible light source receive power from power supply circuitry; the power supply circuitry is capable of receiving power from a battery and a line power source; and the area is illuminated using the infrared light source in response to the power supply circuitry switching from receiving power from the battery to receiving power from the line power source.

Example 4 includes the subject matter of any of Examples 1 through 3, further comprising determining that an ambient light level is below a low light threshold, wherein the area is illuminated using the infrared light source in response to determining that the ambient light level is below the low light threshold.

Example 5 includes the subject matter of any of Examples 1 through 4, further comprising storing, in a memory, at least a portion of the one or more images of the area that are captured while the area is illuminated using the infrared light source.

Example 6 includes the subject matter of any of Examples 1 through 5, further comprising: storing, in a memory, at least a portion of the one or more images of the area that are captured while the area is illuminated using the infrared light source; and storing, in the memory one or more spotlight images of the area that are captured while the area is illuminated using the visible light source; wherein the portion of the one or more images and the one or more spotlight images comprise a recorded video recording.

Example 7 includes the subject matter of any of Examples 1 through 6, further comprising storing, in a memory, at least a portion of the one or more images of the area that are captured while the area is illuminated using the infrared light source, wherein: the portion of the one or more images that are stored in the memory comprise a pre-roll video clip; and the pre-roll video clip shows the object entering the area.

Example 8 includes the subject matter of any of Examples 1 through 7, further comprising making a determination that the object represents a potential threat.

Example 9 includes the subject matter of Example 8, further comprising making a determination that the object is at least a portion of a human.

Example 10 includes the subject matter of any of Examples 1 through 9, further comprising, in response to identifying the object: turning off the infrared light source; and illuminating the area using the visible light source.

Example 11 includes the subject matter of any of Examples 1 through 10, further comprising: making a subsequent determination that the object has left the area; and after making the subsequent determination, turning off the visible light source and illuminating the area using the infrared light source.

Example 12 is a camera comprising: an image sensor; an infrared light source; a visible light source; power supply circuitry configured to receive power from a line power source and provide power to the infrared light source and the visible light source; and at least one processor that is operatively coupled to the image sensor, the infrared light source, and the visible light source, the at least one processor configured to illuminate an area using the infrared light source; while the area is illuminated using the infrared light source, use the image sensor to capture one or more images of the area; analyze the one or more images to identify an object in the area; and after identifying the object, illuminate the area using the visible light source.

Example 13 includes the subject matter of Example 12, further comprising a memory, wherein: the at least one processor is further configured to store, in the memory, at least a portion of the one or more images of the area that are captured while the area is illuminated using the infrared light source; the portion of the one or more images that are stored in the memory comprise a pre-roll video clip; a first portion of the pre-roll video clip shows the area without the object; and a second portion of the pre-roll video clip shows the object present in the area.

Example 14 includes the subject matter of Example 12 or Example 13, wherein the power supply circuitry is capable of receiving power from the line power source and a battery; and the at least one processor is configured to illuminate the area using the infrared light source in response to the power supply circuitry switching from receiving power from the battery to receiving power from the line power source.

Example 15 includes the subject matter of any of Examples 12 through 14, further comprising: a power supply port configured to couple the power supply circuitry to the line power source; and a housing; wherein the infrared light source, the visible light source, and the power supply port are coupled to the housing.

Example 16 includes the subject matter of any of Examples 12 through 15, further comprising an ambient light sensor, wherein the at least one processor is configured to illuminate the area using the infrared light source in response to the ambient light sensor detecting an ambient light level that is below a low light threshold.

Example 17 includes the subject matter of any of Examples 12 through 16, further comprising a network interface, wherein: the at least one processor is further configured to transmit, via the network interface, to at least one of a monitoring center environment or a data center environment, at least a portion of the one or more images of the area that are captured while the area is illuminated using the infrared light source; and the portion of the one or more images that are transmitted via the network interface comprise a pre-roll video clip.

Example 18 is one or more non-transitory computer readable media storing sequences of instructions executable to control a security camera disposed at a location, the sequences of instructions comprising instructions to: illuminate an area using a first light source; while the area is illuminated using the first light source, capture one or more images of the area; analyze the one or more images to identify an object in the area; make a determination that the object represents a potential threat; and after making the determination, illuminate the area using a second light source.

Example 19 includes the subject matter of claim 18, wherein: the first light source illuminates the area using electromagnetic radiation that is imperceptible to humans; and the second light source illuminates the area using electromagnetic radiation that is perceptible to humans.

Example 20 includes the subject matter of claim 18, wherein: the first light source illuminates the area using infrared light; and the second light source illuminates the area using visible light.

Use of ordinal terms such as "first", "second", "third", and so forth, in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method comprising:
    illuminating an area using an infrared light source;
    while the area is illuminated using the infrared light source, capturing one or more images of the area;
    analyzing the one or more images to identify an object in the area; and
    after identifying the object, illuminating the area using a visible light source;
    wherein the infrared light source and the visible light source receive power from power supply circuitry; and
    wherein the power supply circuitry is capable of receiving power from a battery and an external power source.

2. The method of claim 1, wherein:
    the power supply circuitry is capable of receiving power from a line power source; and
    the area is illuminated using the infrared light source in response to the power supply circuitry switching from receiving power from the battery to receiving power from the line power source.

3. The method of claim 1, further comprising determining that an ambient light level is below a low light threshold, wherein the area is illuminated using the infrared light source in response to determining that the ambient light level is below the low light threshold.

4. The method of claim 1, further comprising storing, in a memory, at least a portion of the one or more images of the area that are captured while the area is illuminated using the infrared light source.

5. The method of claim 1, further comprising:
    storing, in a memory, at least a portion of the one or more images of the area that are captured while the area is illuminated using the infrared light source; and
    storing, in the memory one or more spotlight images of the area that are captured while the area is illuminated using the visible light source;
    wherein the portion of the one or more images and the one or more spotlight images comprise a recorded video recording.

6. The method of claim 1, further comprising storing, in a memory, at least a portion of the one or more images of the area that are captured while the area is illuminated using the infrared light source, wherein:
    the portion of the one or more images that are stored in the memory comprise a pre-roll video clip; and
    the pre-roll video clip shows the object entering the area.

7. The method of claim 1, further comprising making a determination that the object represents a potential threat.

8. The method of claim 7, further comprising making a determination that the object is at least a portion of a human.

9. The method of claim 1, further comprising, in response to identifying the object:
    turning off the infrared light source; and
    illuminating the area using the visible light source.

10. The method of claim 1, further comprising:
    making a determination that the object has left the area; and
    after making the determination, turning off the visible light source and illuminating the area using the infrared light source.

11. A camera comprising:
    an image sensor;
    an infrared light source;
    a visible light source;
    power supply circuitry configured to receive power from a line power source and provide power to the infrared light source and the visible light source; and
    at least one processor that is operatively coupled to the image sensor, the infrared light source, and the visible light source, the at least one processor configured to:
        illuminate an area using the infrared light source;
        while the area is illuminated using the infrared light source, use the image sensor to capture one or more images of the area;
        analyze the one or more images to identify an object in the area; and
        after identifying the object, illuminate the area using the visible light source.

12. The camera of claim 11, further comprising a memory, wherein:
    the at least one processor is further configured to store, in the memory, at least a portion of the one or more images of the area that are captured while the area is illuminated using the infrared light source;
    the portion of the one or more images that are stored in the memory comprise a pre-roll video clip;
    a first portion of the pre-roll video clip shows the area without the object; and
    a second portion of the pre-roll video clip shows the object present in the area.

13. The camera of claim 11, wherein:
    the power supply circuitry is capable of receiving power from the line power source and a battery; and
    the at least one processor is configured to illuminate the area using the infrared light source in response to the power supply circuitry switching from receiving power from the battery to receiving power from the line power source.

14. The camera of claim 11, further comprising:
a power supply port configured to couple the power supply circuitry to the line power source; and
a housing;
wherein the infrared light source, the visible light source, and the power supply port are coupled to the housing.

15. The camera of claim 11, further comprising an ambient light sensor, wherein the at least one processor is configured to illuminate the area using the infrared light source in response to the ambient light sensor detecting an ambient light level that is below a low light threshold.

16. The camera of claim 11, further comprising a network interface, wherein:
the at least one processor is further configured to transmit, via the network interface, to at least one of a monitoring center environment or a data center environment, at least a portion of the one or more images of the area that are captured while the area is illuminated using the infrared light source; and
the portion of the one or more images that are transmitted via the network interface comprise a pre-roll video clip.

17. One or more non-transitory computer readable media storing sequences of instructions executable to control a security camera disposed at a location, the sequences of instructions comprising instructions to:
illuminate an area using a first light source, wherein the first light source illuminates the area using infrared light;
while the area is illuminated using the first light source, capture one or more images of the area;
analyze the one or more images to identify an object in the area; and
after identifying the object, illuminate the area using a second light source, wherein the second light source illuminates the area using visible light.

18. The one or more non-transitory computer readable media of claim 17, wherein the sequences of instructions further comprise instructions to:
determine that an ambient light level of the area is below a low light threshold; and
illuminate the area using the first light source after determining that the ambient light level is below the low light threshold.

19. The one or more non-transitory computer readable media of claim 17, wherein the sequences of instructions further comprise instructions to store, in a memory, at least a portion of the one or more images of the area that are captured while the area is illuminated using the first light source.

20. The one or more non-transitory computer readable media of claim 17, wherein the sequences of instructions further comprise instructions to:
store, in a memory, at least a portion of the one or more images of the area that are captured while the area is illuminated using the first light source; and
store, in the memory, one or more spotlight images of the area that are captured while the area is illuminated using the second light source, wherein the portion of the one or more images and the one or more spotlight images comprise a video recording.

* * * * *